(12) United States Patent
Wilson

(10) Patent No.: US 12,340,168 B1
(45) Date of Patent: *Jun. 24, 2025

(54) GUI WITH AXES HAVING DIRECTIONAL INDICATORS OF THE ABSENCE OF DATA

(71) Applicant: Allscripts Software, LLC, Raleigh, NC (US)

(72) Inventor: Jefferson Wilson, Williston, VT (US)

(73) Assignee: ALTERA DIGITAL HEALTH, INC., Niagara Falls, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/565,230

(22) Filed: Sep. 9, 2019

Related U.S. Application Data

(63) Continuation of application No. 15/365,951, filed on Dec. 1, 2016, now Pat. No. 10,409,906.

(51) Int. Cl.
*G06F 40/18* (2020.01)

(52) U.S. Cl.
CPC .................................. *G06F 40/18* (2020.01)

(58) Field of Classification Search
CPC ....................................................... G06F 40/18
See application file for complete search history.

(56) References Cited

U.S. PATENT DOCUMENTS

| | | |
|---|---|---|
| 5,247,611 A | 9/1993 | Norden-Paul et al. |
| 5,255,356 A | 10/1993 | Michelman et al. |
| 5,337,405 A * | 8/1994 | Lindauer ............... G06F 40/18 715/210 |
| 6,057,837 A | 5/2000 | Hatakeda et al. |
| 2002/0161799 A1 | 10/2002 | Maguire, III et al. |
| 2006/0136839 A1 | 6/2006 | Makela |
| 2006/0282818 A1 | 12/2006 | DeSpain |

OTHER PUBLICATIONS

"Find and Highlight All Blank Cells in Your Data [Excel Tips]" available at https://chandoo.org/wp/find-and-highlight-all-blank-cells-in-your-data-excel-tips/, Apr. 20, 2015, (hereinafter Chandoo).*
"MS Excel: LEN function" available at https://web.archive.org/web/20150321004351/https://www.techonthenet.com/excel/formulas/len.php , Mar. 21, 2015 (hereinafter Tech).*

(Continued)

*Primary Examiner* — Henry Orr
(74) *Attorney, Agent, or Firm* — CALFEE, HALTER & GRISWOLD LLP

(57) ABSTRACT

A method of displaying a GUI including a multidimensional array of axes includes constructing a multidimensional array of axes, each axis comprising a plurality of entities located therealong, each entity configured to contain data for display on the axis; for a particular axis of the axes of the array, determining an entity first encountered in a first direction along the particular axis which contains data for display on the particular axis; displaying a view of the array of axes, which view comprises at least a portion of the particular axis that precedes the first encountered data-containing entity in the first direction; and, in conjunction with the displaying of the view of the array of axes, providing an indicator of an absence of data for display being contained in each entity of the particular axis preceding the first data-containing entity encountered in the first direction.

20 Claims, 43 Drawing Sheets

(56) References Cited

OTHER PUBLICATIONS

"COUNTA function" available at http://web.archive.org/web/20161010172240/https://support.office.com/en-us/article/counta-function-7dc98875-d5c1-46f1-9a82-53f3219e2509 , Oct. 10, 2016 (hereinafter COUNTA).*
"Preliminary Amendment for U.S. Appl. No. 15/365,951", Filed Date: Dec. 1, 2016, 3 pages.
"Preliminary Amendment for U.S. Appl. No. 15/365,951", Filed Date: Dec. 29, 2016, 29 pages.
"Non-Final Office Action for U.S. Appl. No. 15/365,951", Mailed Date: Nov. 2, 2018, 19 pages.
"Find and Highlight All Blank Cells In Your Data [Excel Tips]", Apr. 20, 2015, Retrieved Date: Oct. 23, 2018, Retrieved At: <<https://chandoo.org/wp/find-and-highlight-all-blank-cells-in-your-data-excel-tips/>>, 19 pages.
"Response to the Non-Final Office Action for U.S. Appl. No. 15/365,951", Filed Date: Mar. 4, 2019, 14 pages.
"Finding The Last Used Cell in a Range", Aug. 20, 2008, Retrieved Date: Apr. 25, 2019, Retrieved At: <<http://www.cpearson.com/Excel/LastCell.aspx>>, 4 pages.
"Notice of Allowance and Fees Due for U.S. Appl. No. 15/365,951", Mailed Date: Apr. 30, 2019, 8 pages.

* cited by examiner

| Chart Viewer | Allergies | Health Management Plan | Meds/Orders | Problem | Patient Worklist |
|---|---|---|---|---|---|

Doe, John A.
Age: 73 | Sex M | MRN 933145526

Medication Flowsheet ▽ All Meds ▽

| Medication | Problem(s) | Status | 15 Apr 2016 | 14 Apr 2016 | 13 Apr 2016 | 12 Apr 2016 |
|---|---|---|---|---|---|---|
| Amlodipine TABS | High BP | Inactive | | | | |
| Amoxapine 100 MG | Depression | Inactive | | | | |
| Amoxapine 150 MG | Depression | Active | | | | |
| Amoxicillin 125 MG Chewable | Ulcer | Inactive | | | | |
| Amoxicillin 125 MG Oral | Ulcer | Inactive | | | | |
| Amoxicillin 200 MG Chewable | Ulcer | Active | | | | |
| Diovan 40 MG Tablet | High BP | Inactive | | | Record as History | |
| Diovan 80 MG Tablet | High BP | Inactive | | | Prescribed Take 1... | |
| Diovan 160 MG Tablet | High BP | Active | Prescribed Take 1... | | | |
| Diovan HCT 25 MG Tablet | High BP | Inactive | | | | |

*FIG. 1*

| Chart Viewer | Allergies | Health Management Plan | Meds/Orders | Problem | Patient Worklist |
|---|---|---|---|---|---|

Doe, John A.
Age: 73 | Sex M | MRN 933145526

Medication Flowsheet ▽   All Meds ▽

| oblem(s) | Status | 15 Apr 2016 | 14 Apr 2016 | 13 Apr 2016 | 12 Apr 2016 | 11 Apr 2016 | 10 Apr 2016 |
|---|---|---|---|---|---|---|---|
| High BP | Inactive | | | | | Record as History | |
| epression | Inactive | | | | | | |
| epression | Active | | | | | Prescribed Take 1... | |
| Ulcer | Inactive | | | | | | |
| Ulcer | Inactive | | | | | | |
| Ulcer | Active | | | Record as History | | | |
| High BP | Inactive | | | Prescribed Take 1... | | Prescribed Take 1... | |
| High BP | Inactive | | | | | Record as History | |
| High BP | Active | Prescribed Take 1... | | | | Prescribed Take 1... | |
| High BP | Inactive | | | | | | |

GUI WITH AXES HAVING DIRECTIONAL INDICATORS OF THE ABSENCE OF DATA

RELATED APPLICATIONS

This application is a continuation of U.S. patent application Ser. No. 15/365,951, filed on Dec. 1, 2016, and entitled "GUI WITH AXES HAVING DIRECTIONAL INDICATORS OF THE ABSENCE OF DATA", the entirety of which is incorporated herein by reference.

INCORPORATION BY REFERENCE

The present application hereby incorporates herein by reference the entire disclosure of Appendix A attached hereto.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to graphical user interface methodologies for conveying the absence of data in a multidimensional array.

Every year, more and more data is gathered and utilized in more and more contexts and applications. Information is often organized in a multidimensional array format, and might be displayed to a user in an interface such as a spreadsheet interface showing one dimension as rows and another dimension as columns.

Frequently, the amount of information in a multi-dimensional array will vastly exceed the amount of information that can be displayed in a coherent manner at one time in a graphical interface of an application. For example, a spreadsheet may include way more rows and columns than can be displayed on an electronic display at one time at a size that would be readable to a human user. Accordingly, a user may have to manipulate the interface of the spreadsheet application to access and view cells in rows and columns that are not currently displayed. Further, some applications provide the ability to hide entities in a multi-dimensional array, such as by hiding columns of a spreadsheet. In this example, a user may have to manipulate the interface of the spreadsheet application to access and view cells in hidden rows or columns.

More generally, when a user is accessing information organized in a multidimensional array using a graphical interface displayed on an electronic display and that interface requires user manipulation to access all entities in the multidimensional array (e.g. cells), the user will often manipulate the interface (e.g. via horizontally and/or vertically scrolling) to access previously non-displayed entities (e.g. hidden or off-screen cells) in the dimensions (e.g. rows, columns, layers, etc.) that contain information he or she expects could be useful. However, often this manipulation reveals to the user that the entities that were previously not displayed in the dimensions (e.g. rows, rows, columns, layers, etc.) that he or she is interested in are blank. This means that the time and effort that the user just spent on that manipulation activity was wasted.

Frequently, if a user is accessing information organized in a multidimensional array using a graphical interface displayed on an electronic display and that interface requires user manipulation to access all entities (e.g. cells), the user is provided with an indication, such as the presence of a vertical and/or horizontal scroll bar, that lets him or her know that some portion of the array is hidden from view and therefore it is possible that additional useful information will be revealed if he or she scrolls. However the typical indicator is limited to the presence of a scroll bar and this only indicates that some additional display area will be displayed if they scroll. It does not indicate whether this hidden area contains additional cells of interest to the user.

A need exists for improvement in graphical user interface methodologies for conveying the absence of data in a multidimensional array. This, and other needs, are addressed by one or more aspects of the present invention.

SUMMARY OF THE INVENTION

The following is a brief summary of subject matter that is described in greater detail herein. This summary is not intended to be limiting as to the scope of the claims.

The present invention includes many aspects and features. Moreover, while many aspects and features relate to, and are described in, the context of healthcare software, the present invention is not limited to use only in this context, as will become apparent from the following summaries and detailed descriptions of aspects, features, and one or more embodiments of the present invention.

In a first aspect of the invention, a non-transitory computer readable medium contains computer readable instructions which, when executed by a processor of an electronic device, perform a method of displaying a graphical user interface (GUI) including a multidimensional array of axes. The method includes (a) constructing a multidimensional array of axes, each axis comprising a plurality of entities located therealong, each entity configured to contain data for display on the axis; (b) for a particular axis of the axes of the array, determining an entity first encountered in a first direction along the particular axis which contains data for display on the particular axis; (c) displaying a view of the array of axes, which view comprises at least a portion of the particular axis that precedes the first encountered data-containing entity in the first direction; and (d) in conjunction with the displaying of the view of the array of axes, providing an indicator of an absence of data for display being contained in each entity of the particular axis preceding the first data-containing entity encountered in the first direction.

In a feature, the first direction is right-to-left relative to the displayed view.

In a feature, the first direction is left-to-right relative to the displayed view.

In a feature, the first direction is top-to-bottom relative to the displayed view.

In a feature, the first direction is bottom-to-top relative to the displayed view.

In a feature, each entity comprises a cell of a spreadsheet.

In a feature, the indicator is provided by causing each entity of the particular axis preceding the first data-containing entity encountered in the first direction to be displayed with a visual symbol such that each preceding entity is visually distinguished from the first data-containing entity encountered in the first direction.

The visual symbol may comprises, for example, a sequence of an ASCII character; a sequence of arrows; or a sequence of asterisks.

In a feature, the indicator is provided by causing each entity of the particular axis preceding the first data-containing entity in the first direction to have a displayed pattern such that each preceding entity is visually distinguished from the first data-containing entity in the first direction. Each entity may comprise a cell of a spreadsheet, and the displayed pattern may comprise a cross-hatching with which the cell is filled.

In a feature, the indicator is provided by causing each entity of the particular axis preceding the first data-containing entity in the first direction to have a displayed color such that each preceding entity is visually distinguished from the first data-containing entity in the first direction. Each entity may comprise a cell of a spreadsheet, and the displayed color may comprise a color with which the cell is filled or a color in which a border of the cell is displayed, or both.

In a feature, the method further comprises, for the particular axis of the axes of the array, determining an entity first encountered in a direction that is opposite to the first direction which contains data for display on the particular axis; displaying a view of the array of axes, which view comprises at least a portion of the particular axis that precedes the first data-containing entity in the direction opposite to the first direction; and in conjunction with the displaying of the view of the array of axes, providing another indicator of an absence of data for display being contained in each entity of the particular axis preceding the first data-containing entity in the direction opposite to the first direction.

In a feature, the method further comprises, for another particular axis of the axes of the array, determining an entity first encountered in a direction that is opposite to the first direction which contains data for display on this other particular axis; displaying a view of the array of axes, which view comprises at least a portion of this other particular axis that precedes the first data-containing entity in the direction opposite to the first direction; and in conjunction with the displaying of the view of the array of axes, providing another indicator of an absence of data for display being contained in each entity of this other particular axis preceding the first data-containing entity in the direction opposite to the first direction.

In a feature, the method further comprises the step of providing within the displayed view an indicator of an absence of data for display being contained in all entities of another axis.

In an aspect, a non-transitory computer readable medium contains computer readable instructions which, when executed by a processor of an electronic device, perform a method of displaying a graphical user interface (GUI) including a multidimensional array of axes. The method includes: (a) constructing a multidimensional array of axes, each axis comprising a plurality of entities located thereal-ong, each entity configured to contain data for display on the axis: (b) for a particular axis of the axes of the array. (i) determining an entity first encountered in a first direction along the particular axis which contains data for display on the particular axis, and (ii) determining an entity first encountered in a direction that is opposite to the first direction which contains data for display on the particular axis; (c) displaying a view of the array of axes, which view comprises at least a portion of the particular axis that precedes the first encountered data-containing entity in the first direction and that precedes the first encountered data-containing entity in the direction that is opposite to the first direction; and (d) in conjunction with the displaying of the view of the array of axes, (i) providing an indicator of an absence of data for display being contained in each entity of the particular axis preceding the first data-containing entity encountered in the first direction therealong, and (ii) providing a different indicator of an absence of data for display being contained in each entity of the particular axis preceding the first data-containing entity in the direction opposite to the first direction therealong.

In an aspect, a non-transitory computer readable medium contains computer readable instructions which, when executed by a processor of an electronic device, perform a method of displaying a graphical user interface (GUI) including a multidimensional array of axes. The method includes: (a) constructing a multidimensional array of axes, each axis comprising a plurality of entities located thereal-ong, each entity configured to contain data for display on the axis; (b) for a first particular axis of the axes of the array, determining an entity first encountered in a first direction along the particular axis which contains data for display on the particular axis; (c) for a second particular axis of the axes of the array, determining an entity first encountered in a direction that is opposite to the first direction which contains data for display on the second particular axis; (d) displaying a view of the array of axes, which view comprises at least a portion of the first particular axis that precedes the first encountered data-containing entity in the first direction, and that comprises at least a portion of the second particular axis that precedes the first encountered data-containing entity in the direction opposite to the first direction; and (e) in conjunction with the displaying of the view of the array of axes, (i) providing an indicator of an absence of data for display being contained in each entity of the first particular axis preceding the first data-containing entity encountered in the first direction therealong, and (ii) providing a second, different indicator of an absence of data for display being contained in each entity of the second particular axis preceding the first data-containing entity in the direction therealong opposite to the first direction.

In other aspects, each of the computer-readable medium described above comprises a drive of a computer and the computer-readable instructions comprise software for utilizing spreadsheets.

In another aspect, a method of displaying on a screen of an electronic device a graphical user interface (GUI) including a multidimensional array of axes includes the steps of: (a) constructing a multidimensional array of axes, each axis comprising a plurality of entities located therealong, each entity configured to contain data for display on the axis; (b) for a particular axis of the axes of the array, determining an entity first encountered in a first direction along the particular axis which contains data for display on the particular axis; (c) displaying a view of the array of axes, which view comprises at least a portion of the particular axis that precedes the first encountered data-containing entity in the first direction; and (d) in conjunction with the displaying of the view of the array of axes, providing an indicator of an absence of data for display being contained in each entity of the particular axis preceding the first data-containing entity encountered in the first direction.

In an aspect, a method of displaying on a screen of an electronic device a graphical user interface (GUI) including a multidimensional array of axes includes the steps of: (a) constructing a multidimensional array of axes, each axis comprising a plurality of entities located therealong, each entity configured to contain data for display on the axis; (b)

for a particular axis of the axes of the array, (i) determining an entity first encountered in a first direction along the particular axis which contains data for display on the particular axis, and (ii) determining an entity first encountered in a direction that is opposite to the first direction which contains data for display on the particular axis; (c) displaying a view of the array of axes, which view comprises at least a portion of the particular axis that precedes the first encountered data-containing entity in the first direction and that precedes the first encountered data-containing entity in the direction that is opposite to the first direction; and (d) in conjunction with the displaying of the view of the array of axes, (i) providing an indicator of an absence of data for display being contained in each entity of the particular axis preceding the first data-containing entity encountered in the first direction therealong, and (ii) providing a different indicator of an absence of data for display being contained in each entity of the particular axis preceding the first data-containing entity in the direction opposite to the first direction therealong.

In another aspect, a method of displaying on a screen of an electronic device a graphical user interface (GUI) including a multidimensional array of axes includes the steps of: (a) constructing a multidimensional array of axes, each axis comprising a plurality of entities located therealong, each entity configured to contain data for display on the axis; (b) for a first particular axis of the axes of the array, determining an entity first encountered in a first direction along the particular axis which contains data for display on the particular axis; (c) for a second particular axis of the axes of the array, determining an entity first encountered in a direction that is opposite to the first direction which contains data for display on the second particular axis; (d) displaying a view of the array of axes, which view comprises at least a portion of the first particular axis that precedes the first encountered data-containing entity in the first direction, and that comprises at least a portion of the second particular axis that precedes the first encountered data-containing entity in the direction opposite to the first direction; and (e) in conjunction with the displaying of the view of the array of axes, (i) providing an indicator of an absence of data for display being contained in each entity of the first particular axis preceding the first data-containing entity encountered in the first direction therealong, and (ii) providing a second, different indicator of an absence of data for display being contained in each entity of the second particular axis preceding the first data-containing entity in the direction therealong opposite to the first direction.

Additional aspects and features are disclosed in the Appendix, which is incorporated herein by reference.

In addition to the aforementioned aspects and features of the present invention, it should be noted that the present invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the present invention now will be described in detail with reference to the accompanying drawings, wherein the same elements are referred to with the same reference numerals, and wherein, FIG. 1 illustrate an exemplary interface of a healthcare application;

FIGS. 2-3 illustrate the use of color or pattern coding to convey that no additional information is available in further cells of a data grid;

FIG. 4 illustrates another exemplary interface of a healthcare application;

FIG. 19 illustrates a spreadsheet;

FIG. 20A highlights a portion of the spreadsheet of FIG. 19;

FIGS. 20B-20C illustrate the display of the highlighted portion of FIG. 20A;

FIG. 21 illustrates the spreadsheet of FIG. 19 with a plurality of indications provided that convey that no additional information is available in one or more particular directions;

FIG. 22A highlights a portion of the spreadsheet of FIG. 21;

FIG. 23A highlights a portion of the spreadsheet of FIG. 21;

FIG. 24A highlights a portion of the spreadsheet of FIG. 21;

FIG. 25 illustrates the spreadsheet of FIG. 19 with color or pattern coding utilized to convey that no additional information is available in one or more particular horizontal directions;

FIG. 26 illustrates the spreadsheet of FIG. 19 with color or pattern coding utilized to convey that no additional information is available in one or more particular vertical directions;

DETAILED DESCRIPTION

Figure 2:
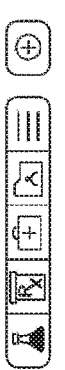

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention, and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element.

With regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." When used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the invention are next described. The following description of one or more preferred embodiments is merely exemplary in nature and is in no way intended to limit the invention, its implementations, or uses.

FIG. 1 illustrates an exemplary interface of a healthcare application. The interface includes a data grid displaying information about medications for patient John Doe. Notably, the data grid includes cells that are not currently displayed that a user can scroll to view. Unfortunately, a practitioner who is interested in the information contained in the data grid has no idea whether any portion of the data grid which is not currently displayed includes data.

In accordance with one or more preferred implementations, one or more cells of a data grid are visually coded to indicate whether additional data is present in cells that are not currently displayed. For example, a cell in a row of a data grid might be colored light blue (or patterned in a particular pattern) to indicate that no additional data is present in any cell in the same row to the right of that cell. FIG. 2 illustrates an exemplary interface where a data grid includes such coloring. For example, the cell for "Amoxapine 100 MG" and "15 Apr. 2016" is colored light blue to indicate that no additional data is present in any cell to the right in the same row. This allows a user who is viewing the data grid and who is interested in any data regarding "Amoxapine 100 MG" to realize that there is no need to scroll right to try to locate additional data for "Amoxapine 100 MG", as no additional data is present in the data grid. FIG. 3 illustrates partial scrolling of the data grid of FIG. 2.

Figure 4:
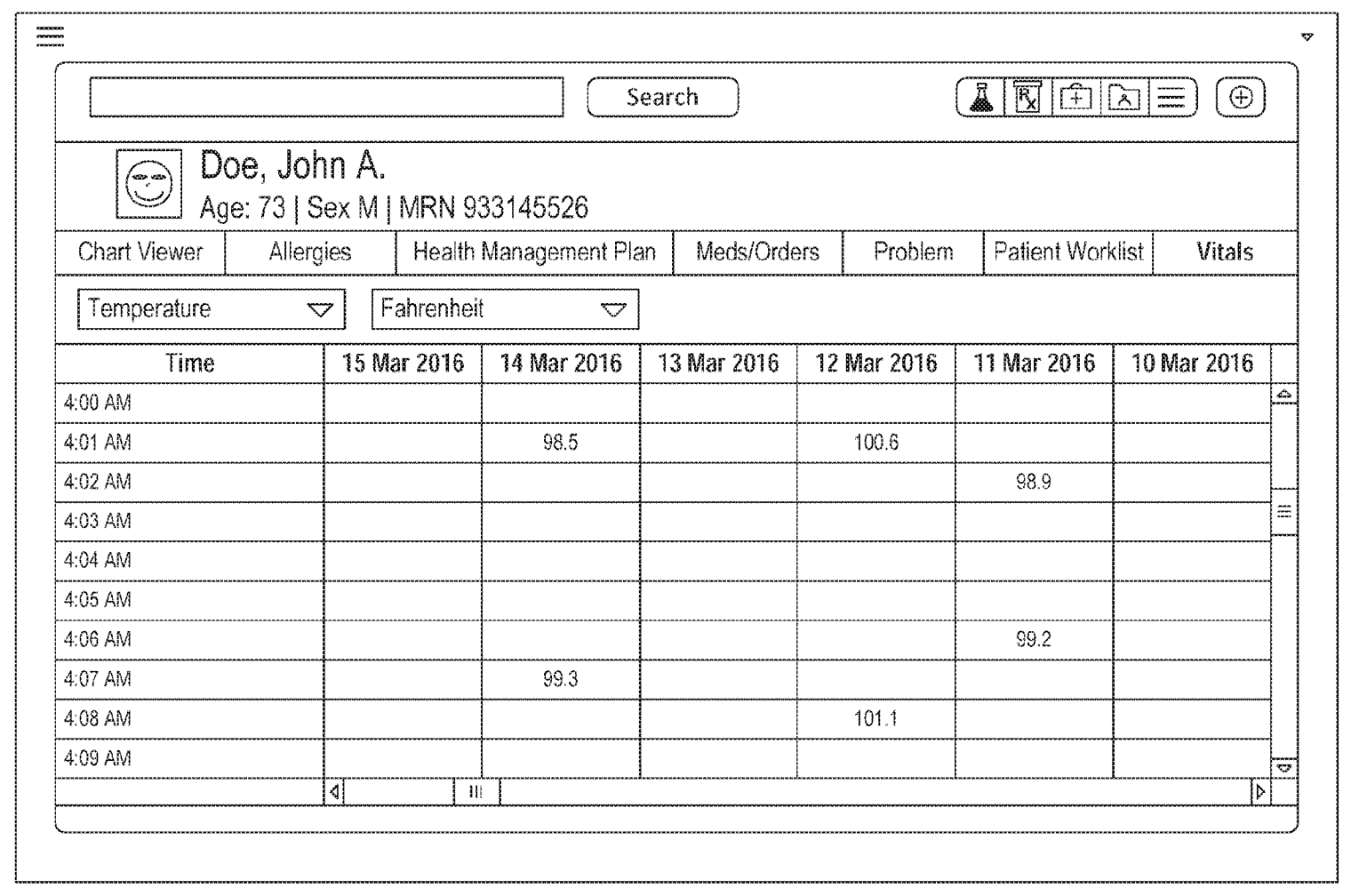

FIG. 4 illustrates another exemplary interface of a healthcare application which includes a data grid displaying vital information for patient John Doe. As with the data grid of FIG. 1, this data grid includes cells that are not currently displayed that a user can scroll to view. In accordance with one or more preferred implementations, one or more cells of the data grid of FIG. 4 can be visually coded to indicate whether additional data is present in cells that are not currently displayed.

Figure 5:
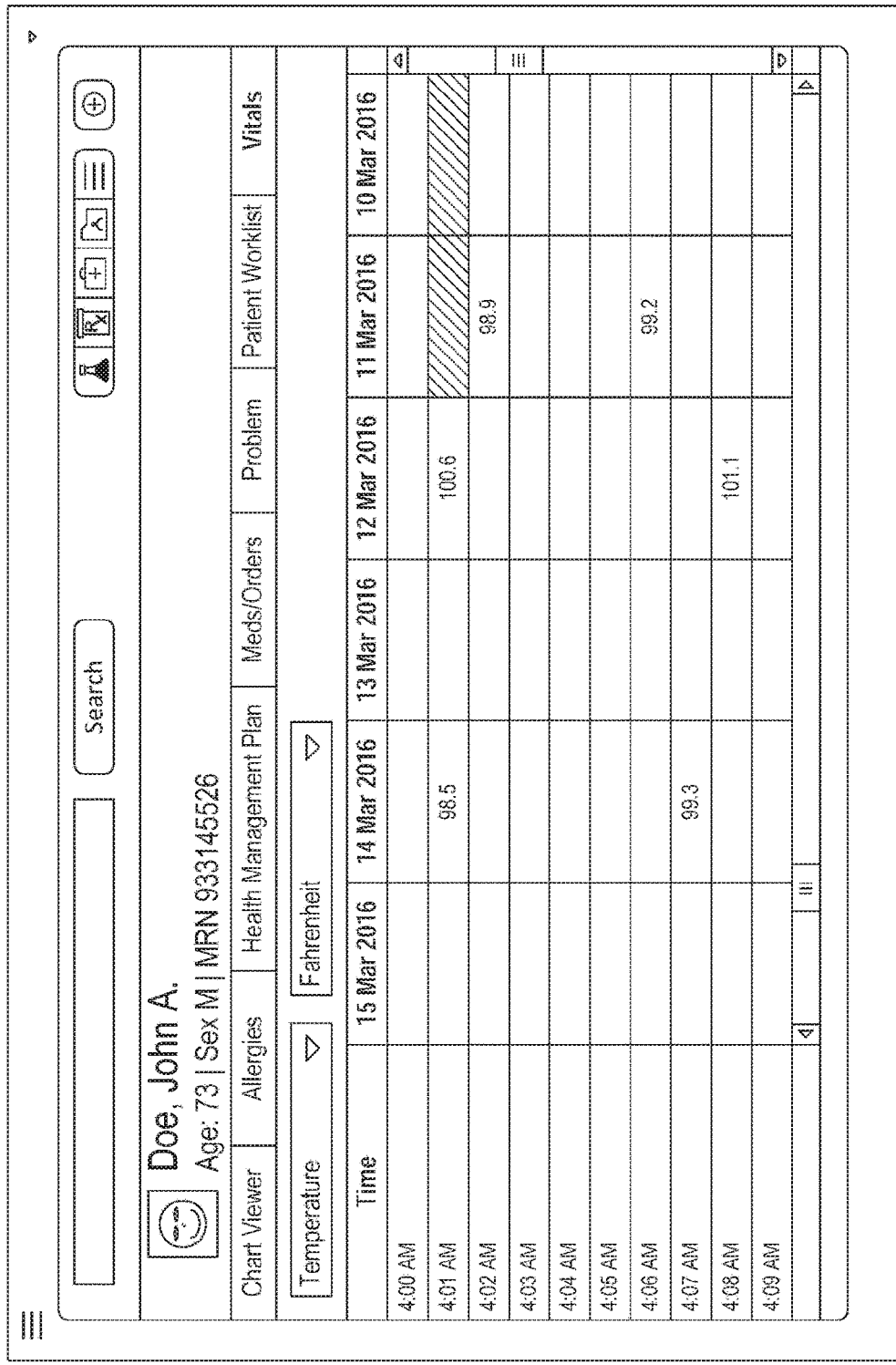
FIGS. 5-12 illustrate the use of color or pattern coding to convey that no additional information is available in further cells of a data grid.
Figure 6:
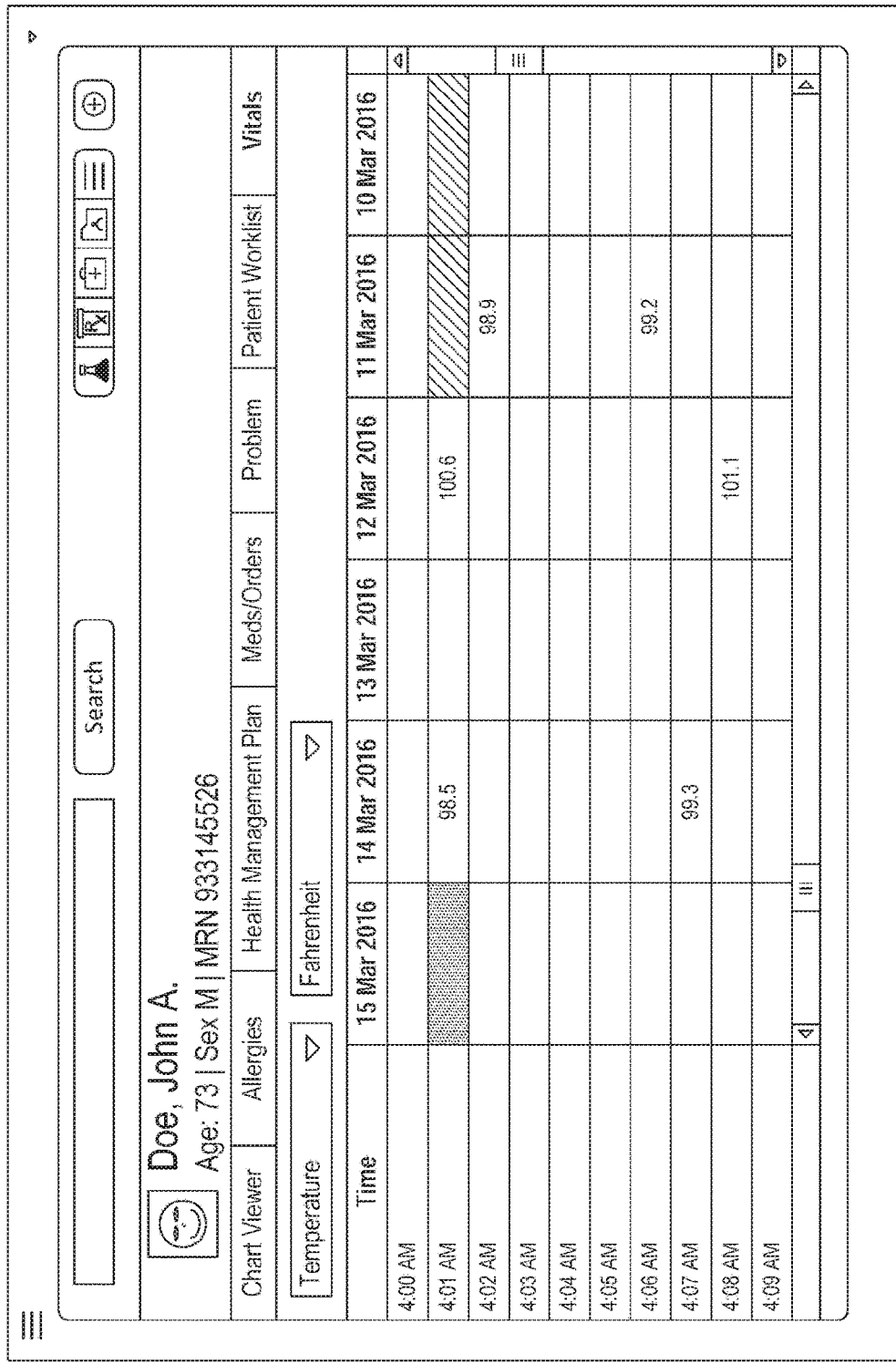

FIG. 5 illustrates an exemplary implementation similar to that illustrated in FIG. 2 in which cells are color coded (e.g. light blue) to indicate that there is no additional data in cells in the same row to the right of the color coded cells. In accordance with one or more preferred implementations, one or more cells are also color coded (preferably in a different color, although in at least some preferred implementations it may be the same color) to indicate that there is no additional data in cells in the same row to the left of the one or more color coded cells, as illustrated in FIG. 6.

Figure 7:
Figure 8:
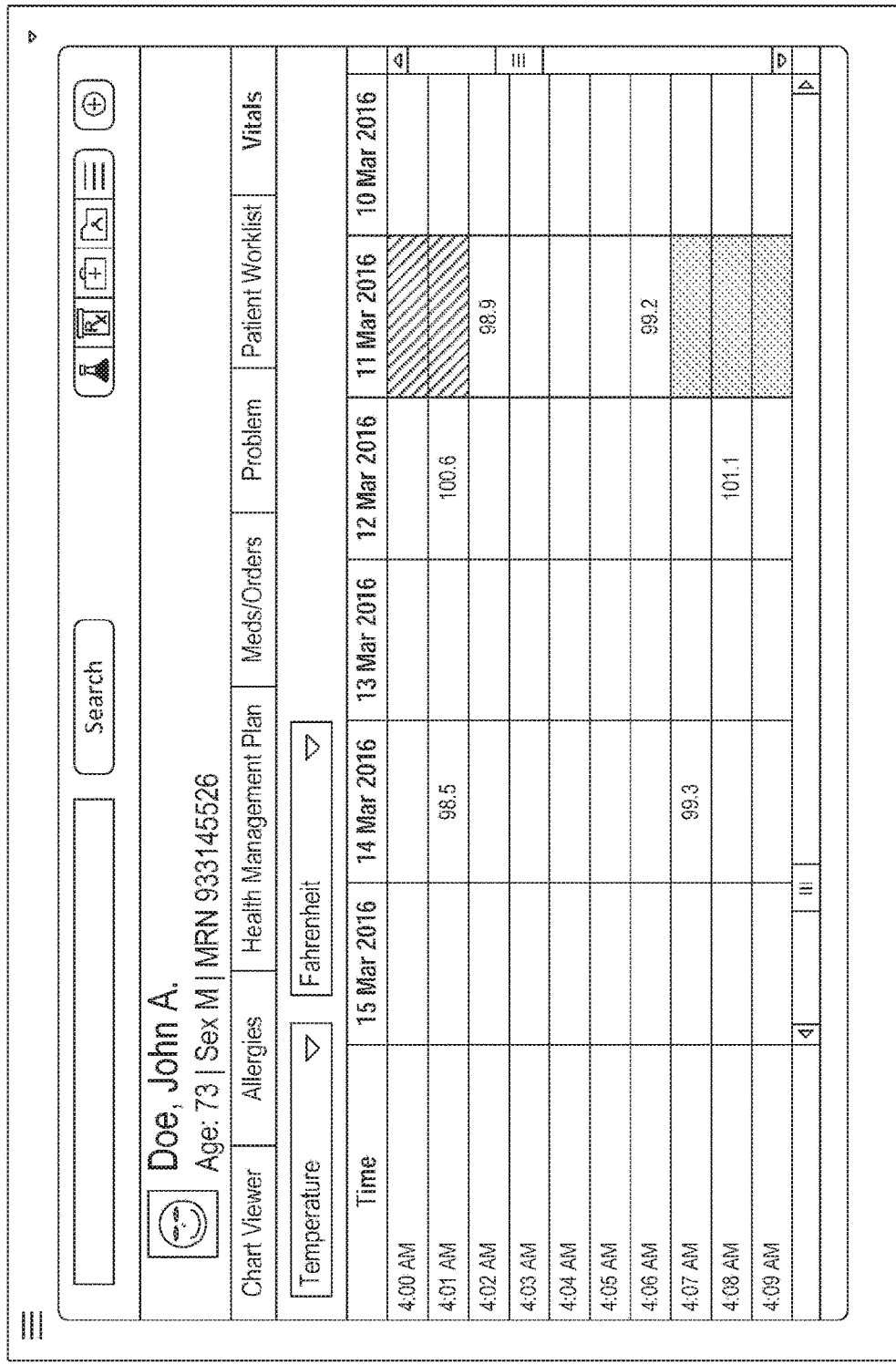

Such color coding can be utilized not only to convey information about non-displayed cells in a row, but similarly can be utilized to convey information about non-displayed cells in a column. For example, FIG. 7 illustrates an exemplary implementation in which cells are color coded to indicate that there is no additional data in cells in the same column below the color coded cells. FIG. 8 further illustrates an implementation in which cells are also color coded (preferably in a different color, although in at least some preferred implementations it may be the same color) to indicate that there is no additional data in cells in the same column above the color coded cells.

Figure 9:
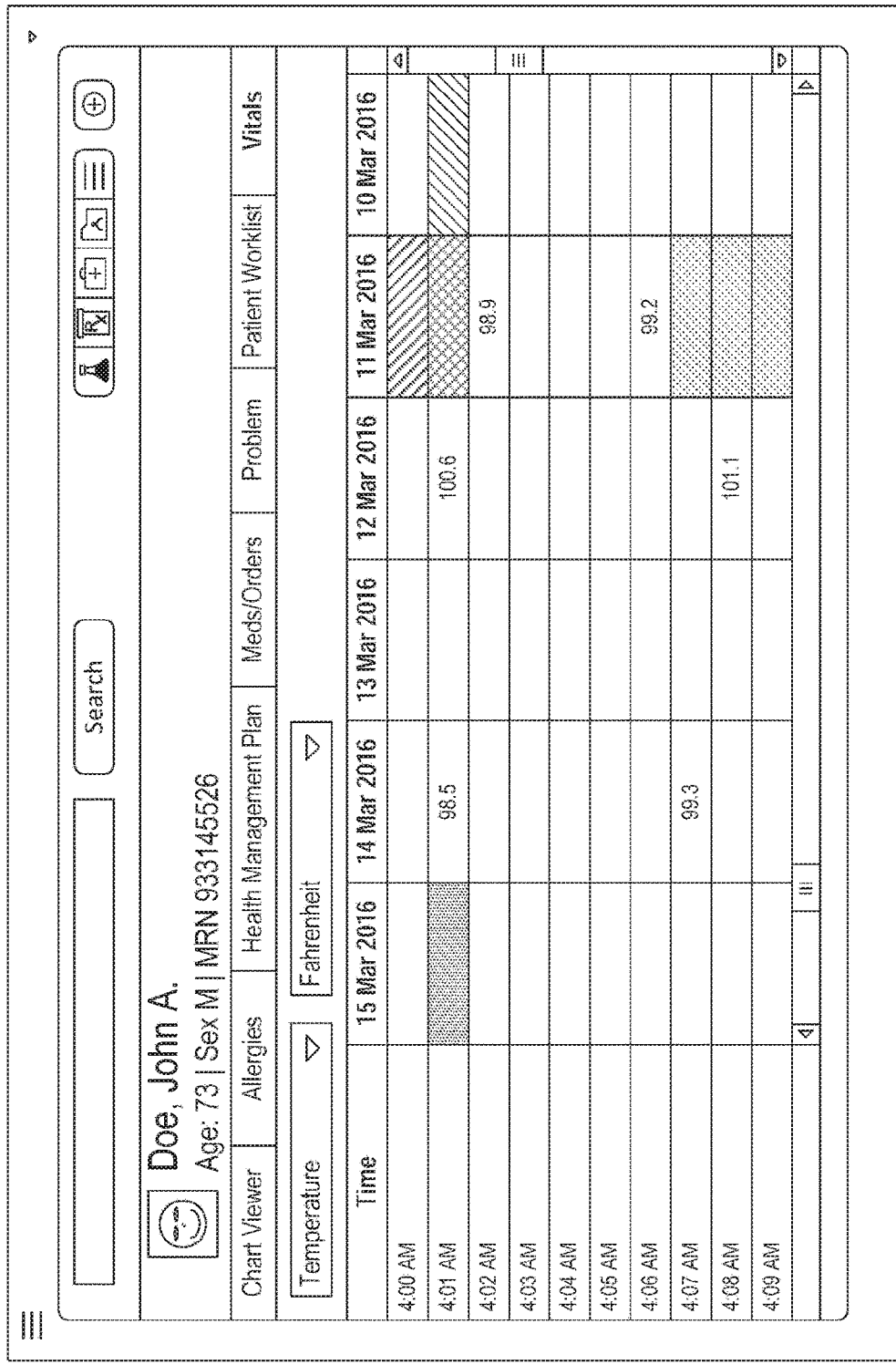

In accordance with one or more preferred implementations, cells may be color coded to convey information about non-displayed cells both row-wise and column-wise. For example, FIG. 9 illustrates an implementation in which a first set of one or more cells is color coded to indicate that there is no additional data in cells in the same row to right of those cells, a second set of one or more cells is color coded to indicate that there is no additional data in cells in the same row to left of those cells, a third set of one or more cells is color coded to indicate that there is no additional data in cells in the same column below those cells, and a fourth set of one or more cells is color coded to indicate that there is no additional data in cells in the same column above those cells. Further, the implementation illustrated in FIG. 9 includes a cell color coded to indicate that there is both no additional data in cells in the same row to right of that cell and no additional data in cells in the same column above that cell. In accordance with one or more preferred implementations, such a cell may be color coded a color that is created by mixing the colors associated with those respective properties. For example, if cells are color coded cyan to indicate that there is no additional data in cells in the same row to right, and color coded yellow to indicate that there is no additional data in cells in the same column above, then a cell with both properties may be color coded green, which results from mixing cyan and yellow. Such mixing may utilize an RGB model, a CMY model, or some other model.

Figure 10:
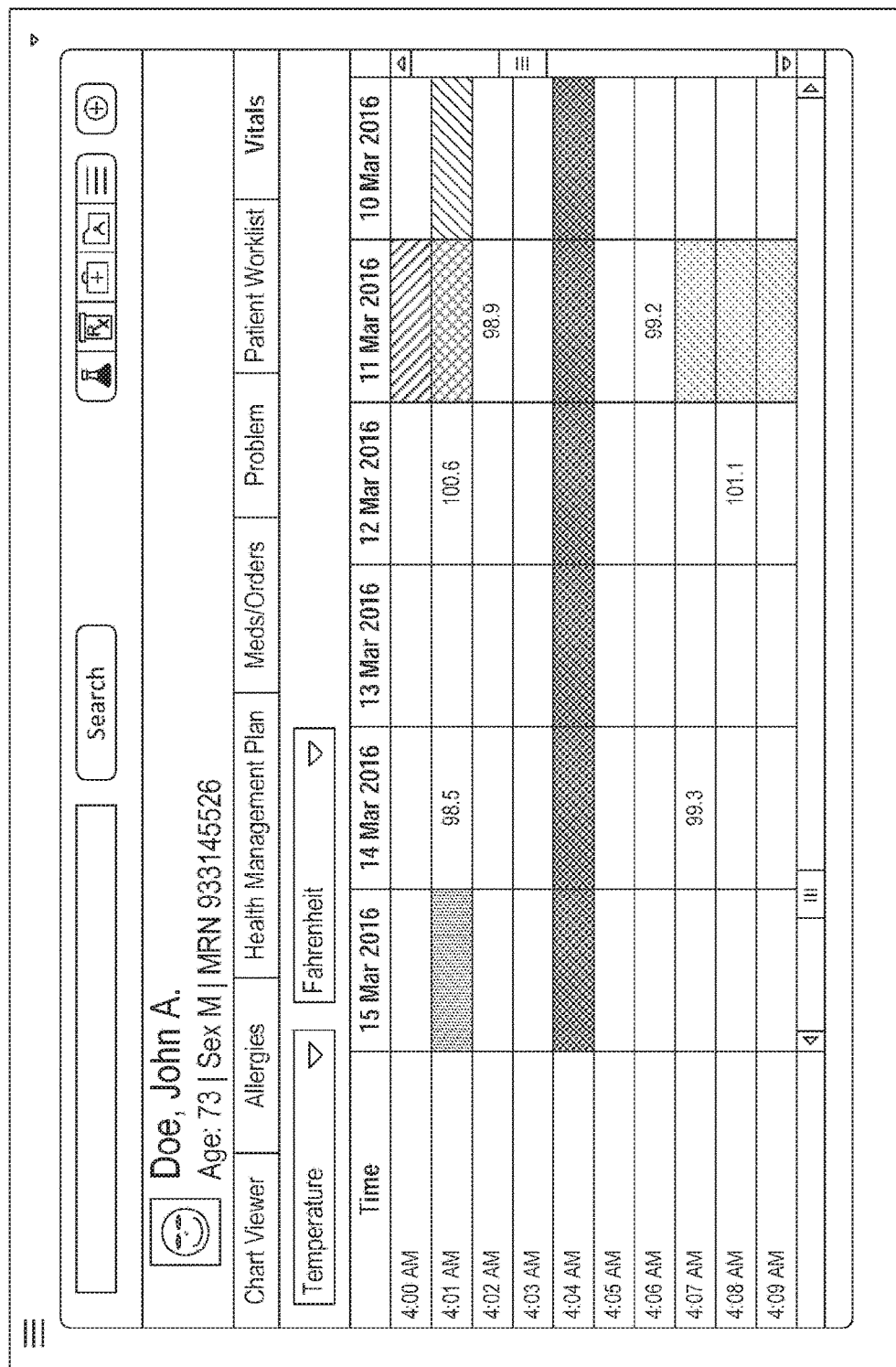
Figure 11:
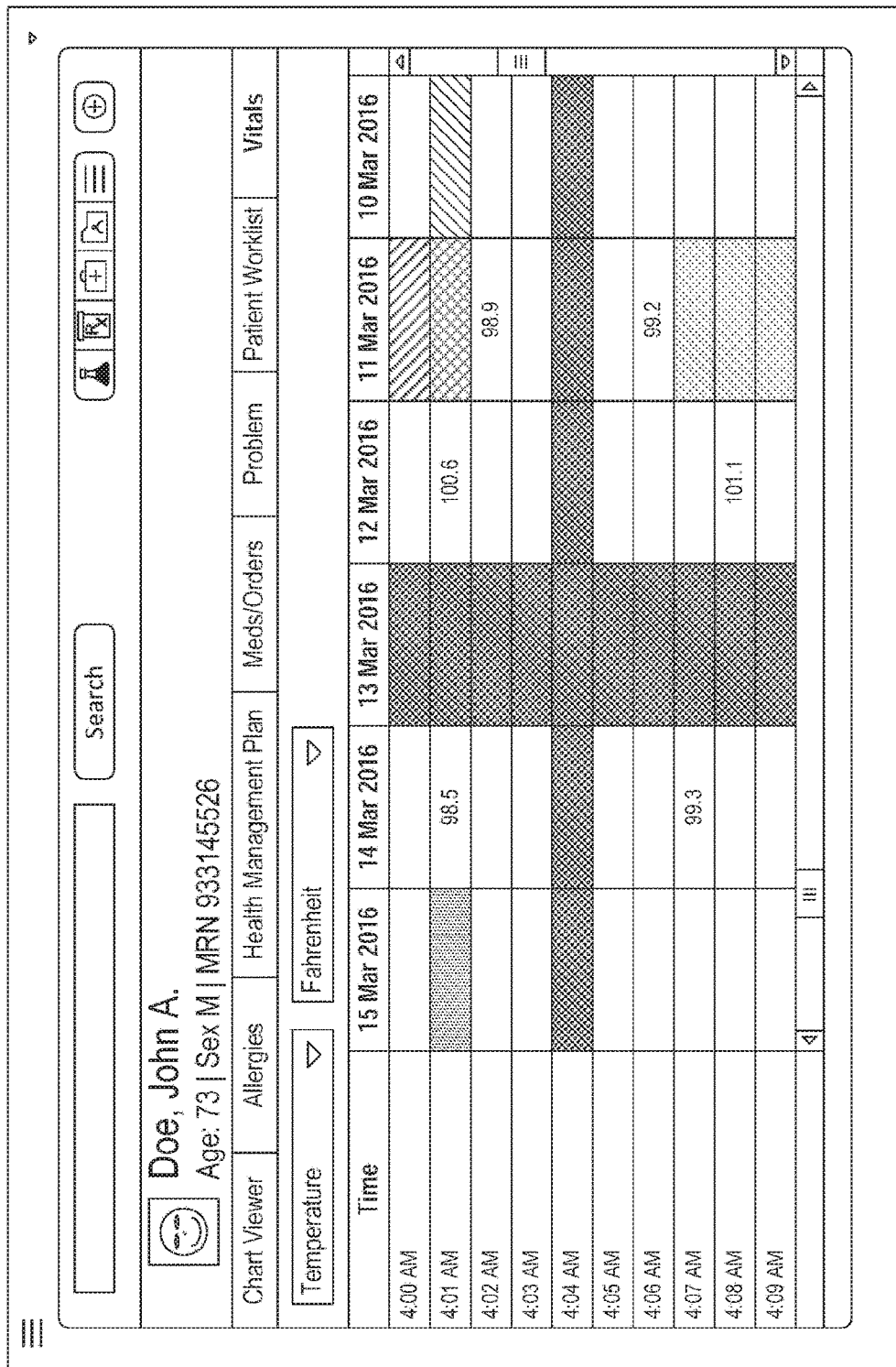
Figure 12:
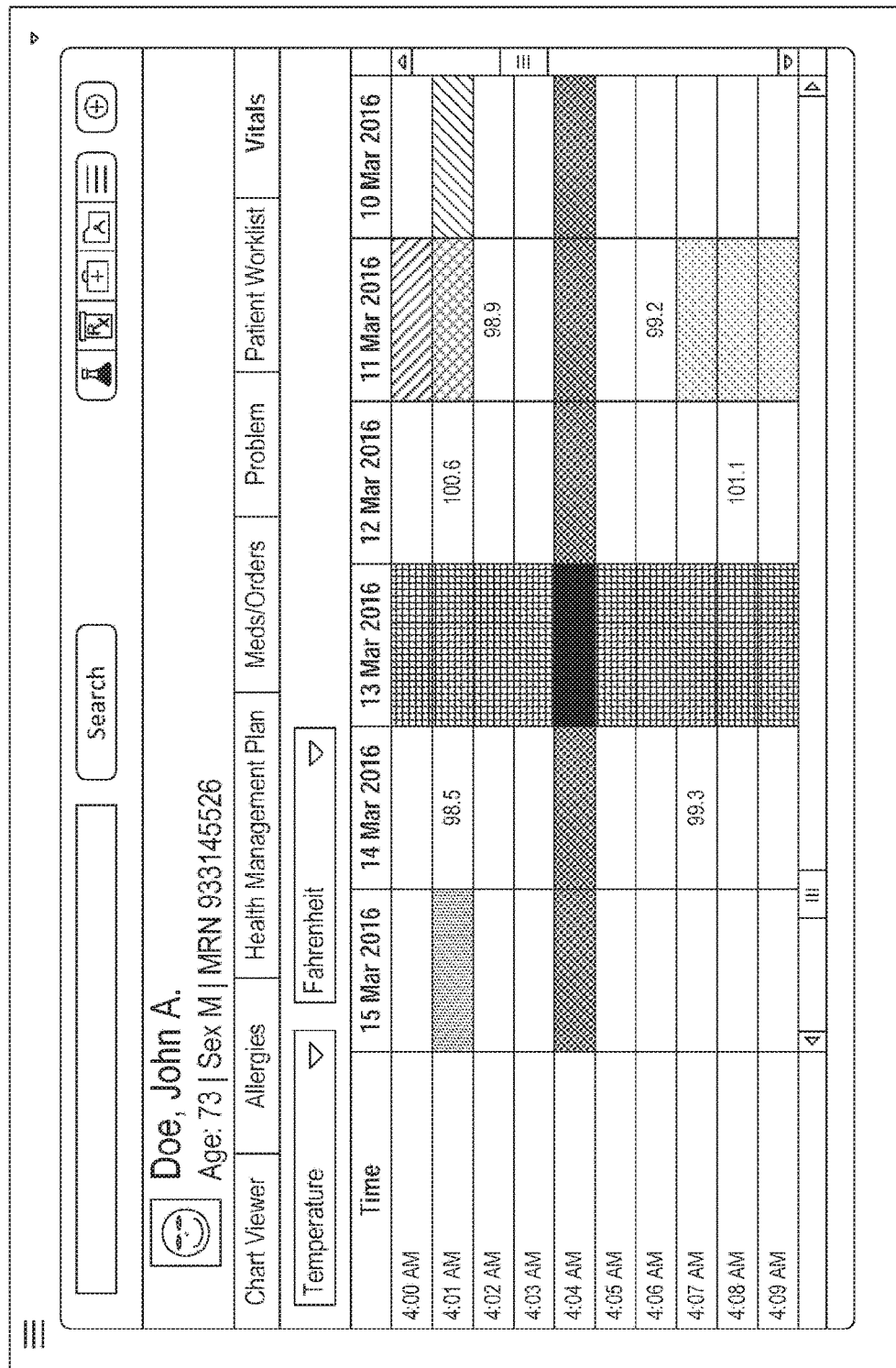

In accordance with one or more preferred implementations, cells may be color coded to indicate that there is no data in an entire row. FIG. 10 illustrates exemplary such color coding to indicate that there is no data in any cell in the row for "4:04 AM". Similarly, in accordance with one or more preferred implementations, cells may be color coded to indicate that there is no data in an entire column. FIG. 11 illustrates exemplary such color coding to indicate that there is no data in any cell in the column for "13 Mar. 2016". In accordance with one or more preferred implementations, color coding for vacant rows and columns may be the same, as illustrated in FIG. 11, or different, as illustrated in FIG. 12. Yet another color may be utilized for a cell belonging to both a row with no data, and a column with no data, as illustrated in FIG. 12.

Although FIGS. 2-12 illustrate the use of coding to indicate whether additional data is present in cells that are not currently displayed, in accordance with one or more preferred implementations, other types of visual coding may be utilized.

Figure 13:
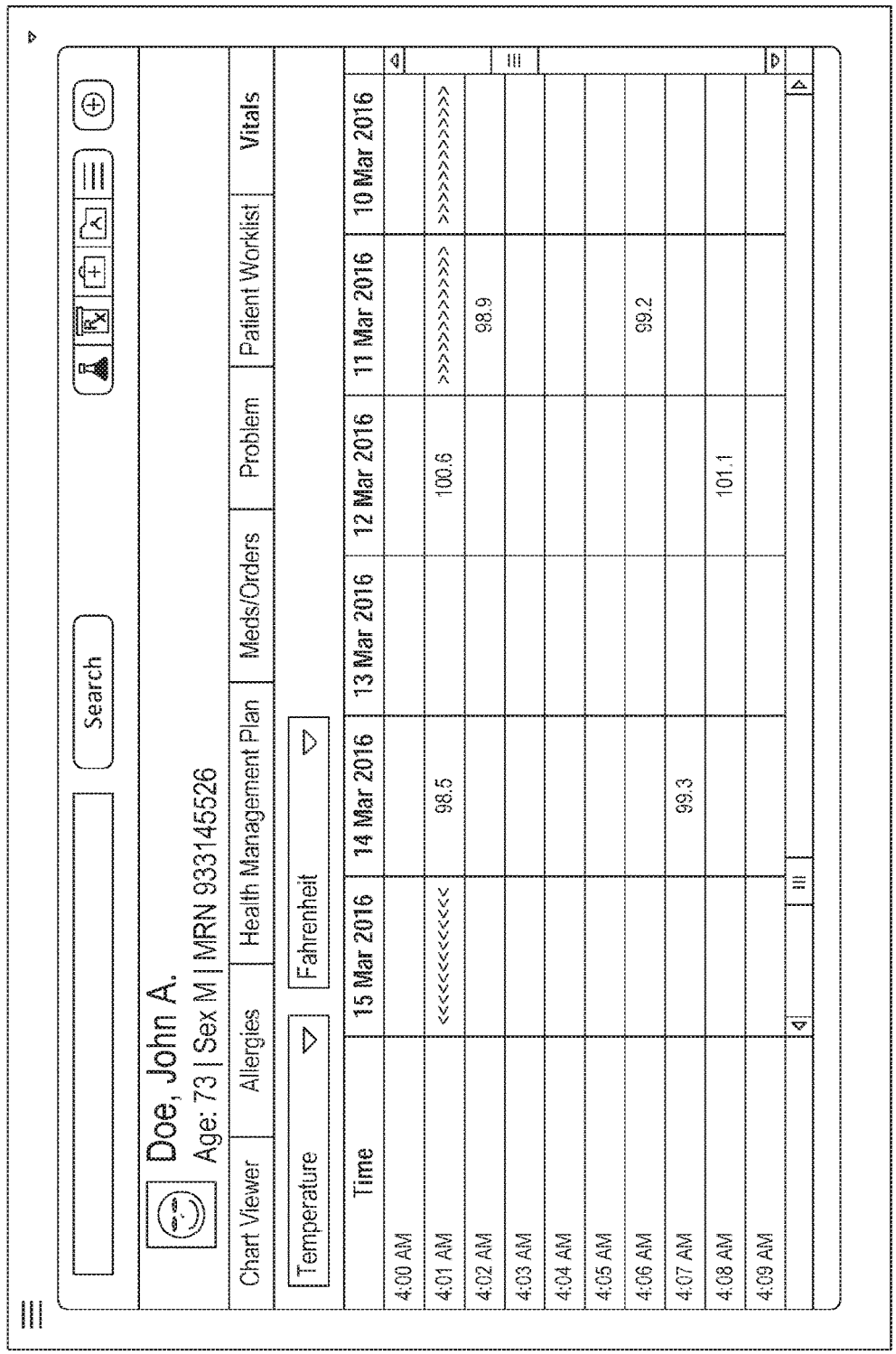
FIGS. 13-18 illustrate the use of symbols to convey that no additional information is available in further cells of a data grid.
Figure 14:
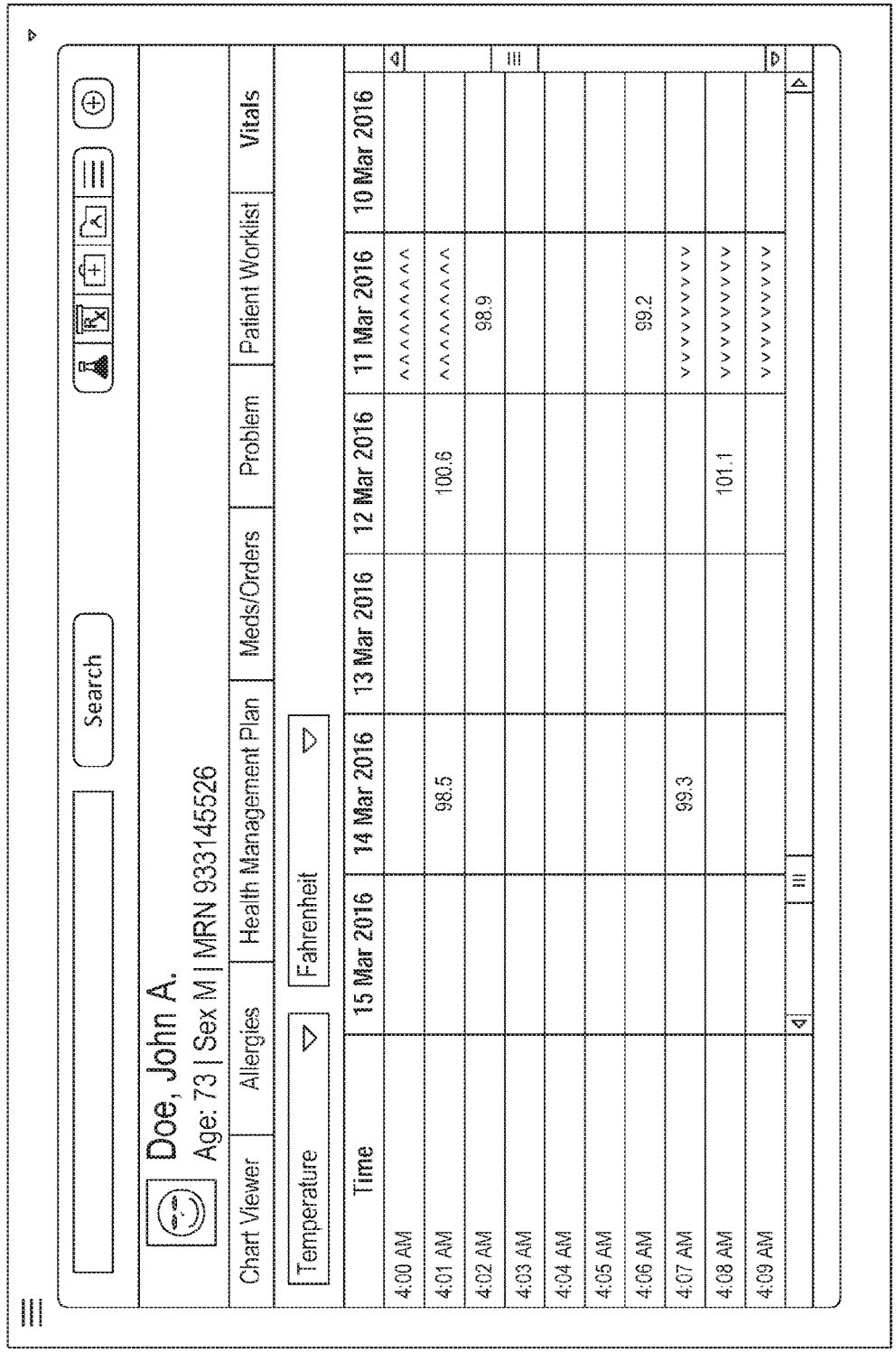
Figure 15:
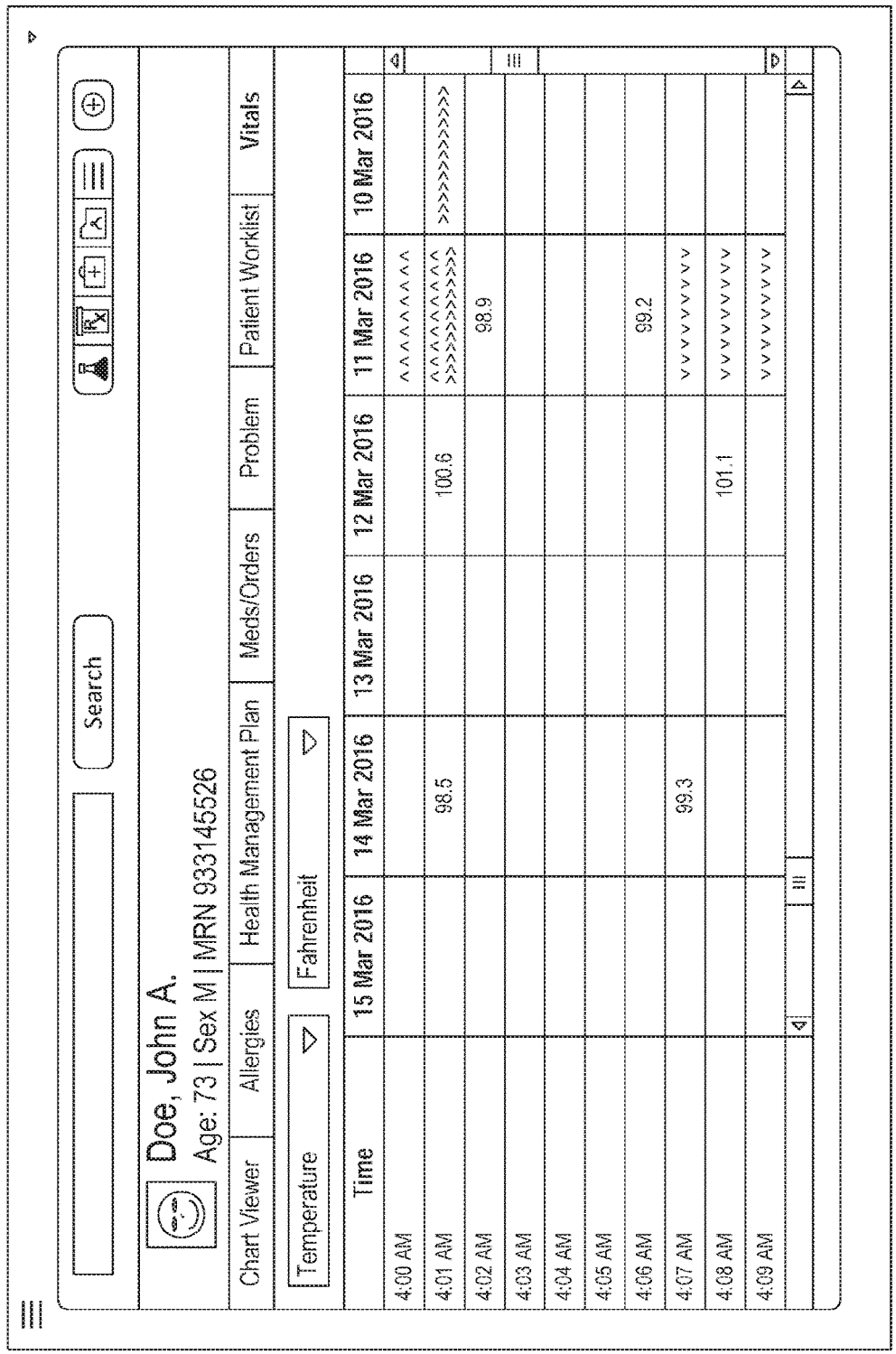
Figure 16:
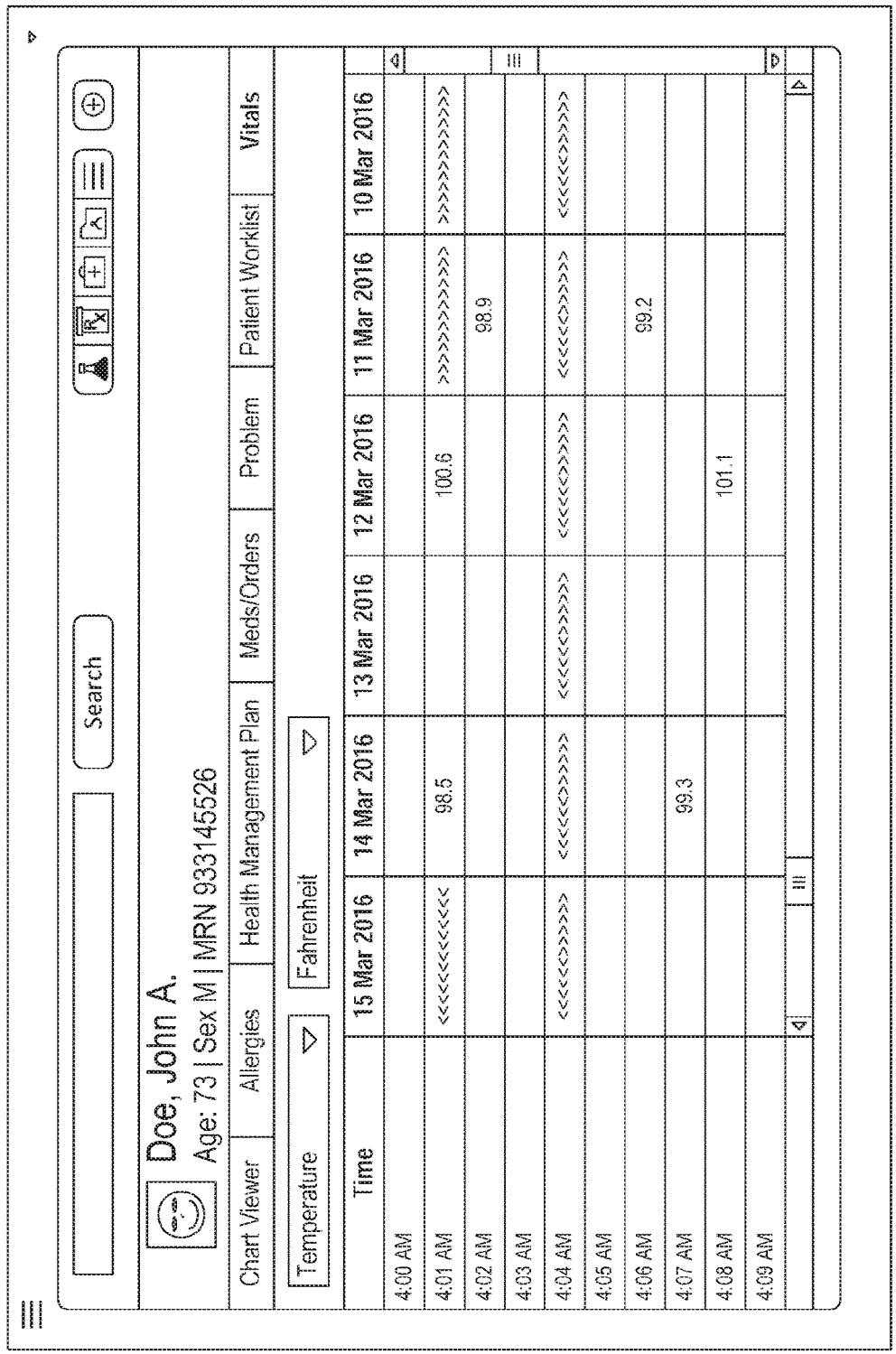
Figure 17:
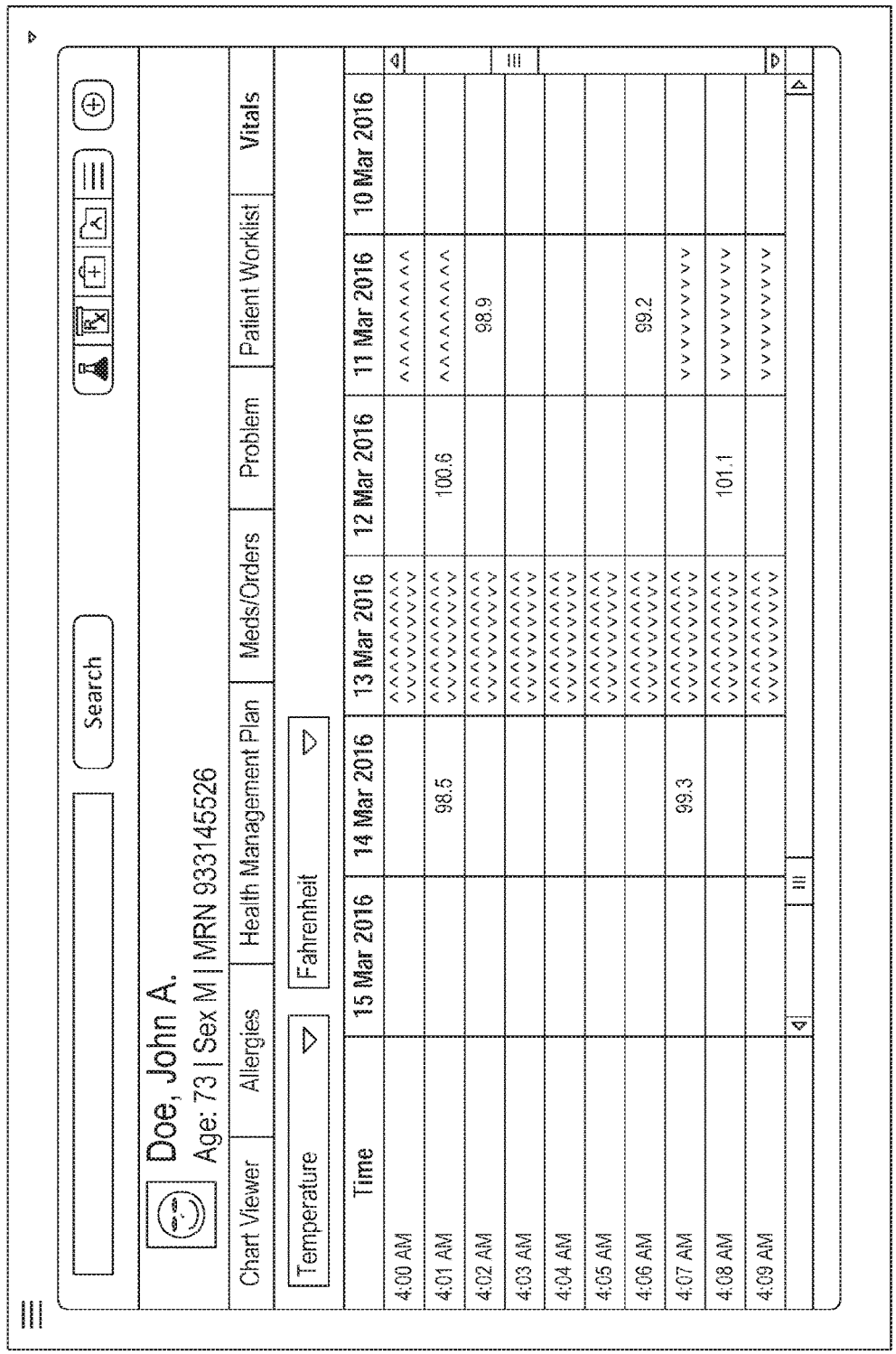
Figure 18:

For example, FIG. 13 illustrates an exemplary implementation in which one or more symbols (e.g. arrow symbols) are utilized to indicate that there is no additional data in cells in the same row to the right or left of the symbol coded cells. Symbols can similarly be utilized to indicate that there is no data in cells in the same column above or below a symbol coded cell, as illustrated in FIG. 14. Further. symbols can be aggregated, or combined, or an entirely new symbol utilized, to indicate some combination of these properties, as illustrated in FIG. 15. Further still, symbols can be aggregated, or combined, or an entirely new symbol utilized, to indicate that there is no data in an entire row (as illustrated in FIG. 16) or column (as illustrated in FIG. 17). A cell may even be coded to indicate that both the entire row and the entire column to which a particular cell belongs are empty, as illustrated in FIG. 18.

Various implementations have been described thus far in the context of a data grid displayed within a healthcare software program. There exist, however, many preferred implementations outside of this context.

As noted hereinabove, when a user is accessing information organized in a multidimensional array using a graphical interface displayed on an electronic display and that interface requires user manipulation to access all entities in the multidimensional array (e.g. cells). the user will often manipulate the interface (e.g. via horizontally and/or vertically scrolling) to access previously non-displayed entities (e.g. hidden or off-screen cells) in the dimensions (e.g. rows, columns, layers, etc.) that contain information he or she expects could be useful. However, often this manipulation reveals to the user that the entities that were previously not displayed in the dimensions (e.g. rows, rows, columns, layers, etc.) that he or she is interested in are blank. This means that the time and effort that the user just spent on that manipulation activity was wasted. Unfortunately, the presence of the scroll bars only indicates to the user that some portion of information is not currently displayed, it does not convey to a user whether additional useful information will be revealed if he or she scrolls.

Generally, in accordance with one or more preferred implementations, when a user is viewing information organized in a multidimensional array (for example, tabular when limited to two dimensions) using a graphical interface displayed on an electronic display and that interface requires the user to actively manipulate the interface to access portions of the array that are not currently visible or accessible on the screen, one or more indications are provided which convey to the user when manipulating the interface in a particular manner (e.g. scrolling along an axis) will not yield any additional useful information. Utilizing such indications, users can avoid spending time and effort only to find that no additional useful information is revealed.

These indications may always be visible, or may be feedback based on user actions. For example, if a user begins to scroll in a particular direction, that may prompt display of color coding or symbols such as that described herein which may not have already been displayed. Alternatively, this coding may always be displayed independent of user action (e.g. even if a user doesn't try to scroll in a particular direction).

One or more preferred implementations involve the provision of an indication for an entity (e.g. a cell) in a multidimensional array that conveys whether any more information is available in a particular direction and along a particular axis. This indication preferably serves to allow the user to determine when manipulating an interface to show additional entities along a particular axis in a particular direction will be fruitless. For example, implementations can provide an indication concerning the utility of navigating in one to n of the available dimensions (e.g. scrolling left/right along an x-axis, scrolling up/down along a y-axis, or scrolling in/out along a z-axis). In accordance with one or more preferred implementations, such an indication may be characterized as a vector, or as having vector-like properties, in that such indication provides an indication both of a direction (e.g. left/right) and a magnitude (e.g. all the way until the end of the row).

Figure 19:
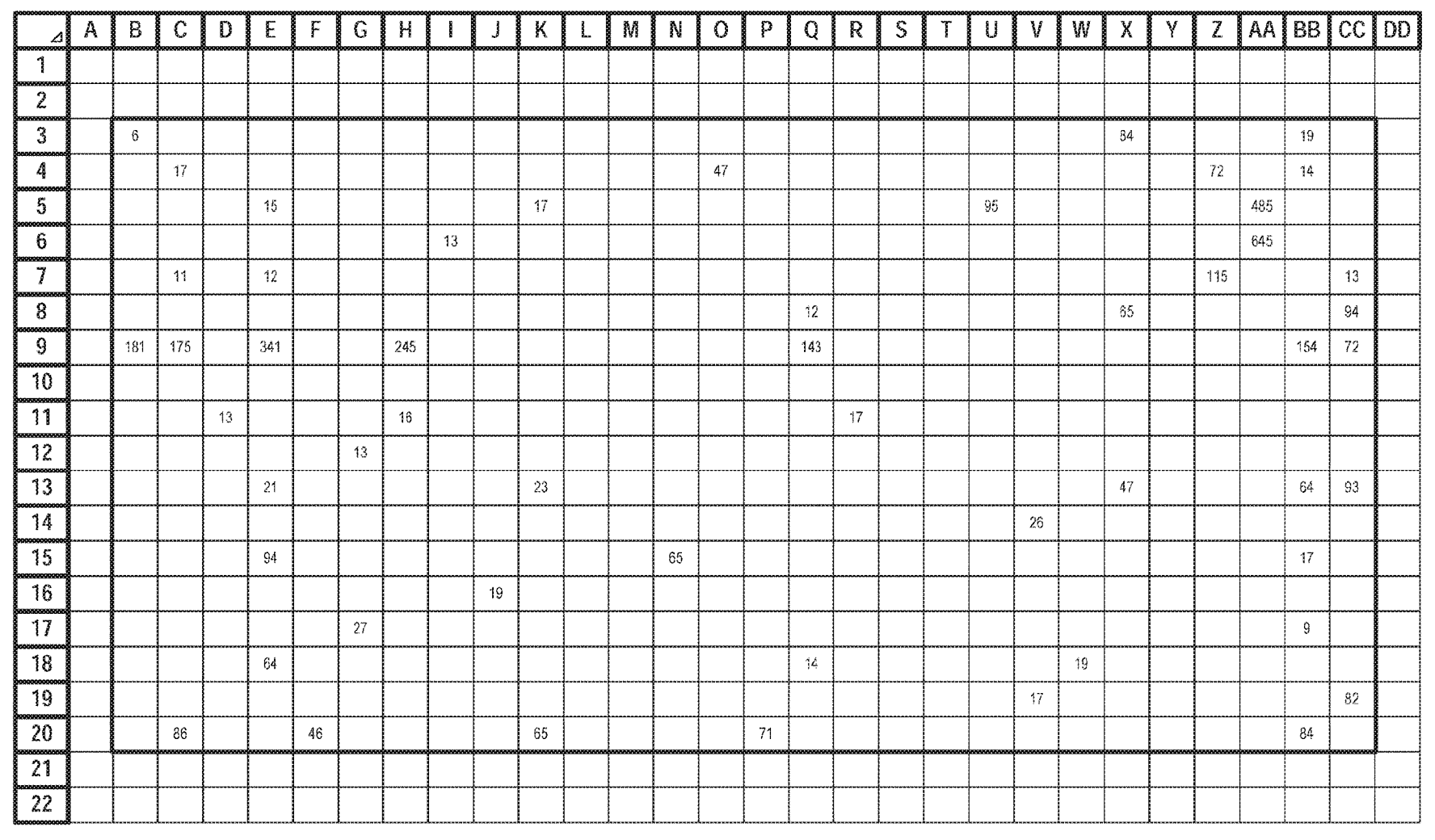
Figure 20A:
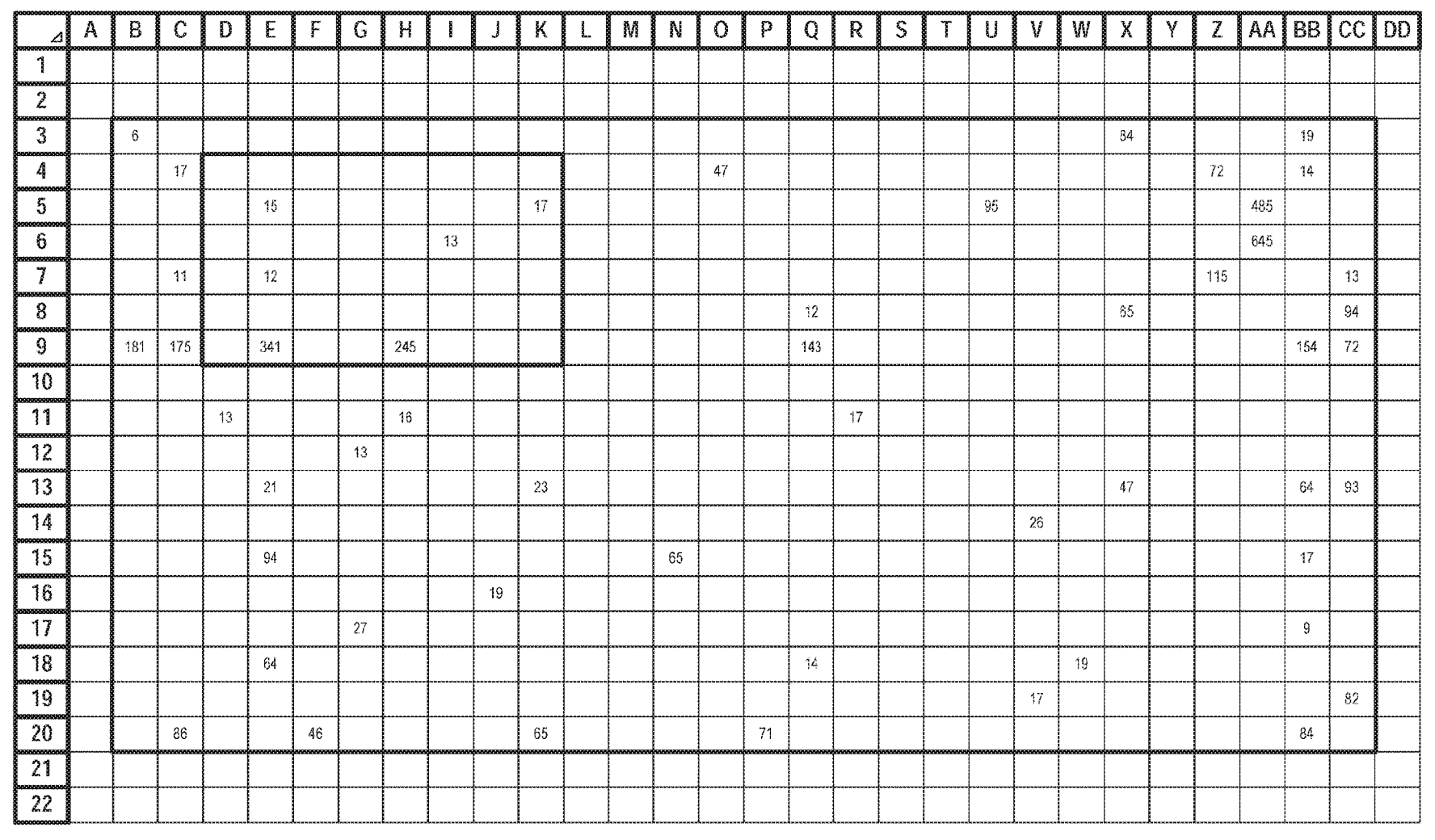
Figure 20B:
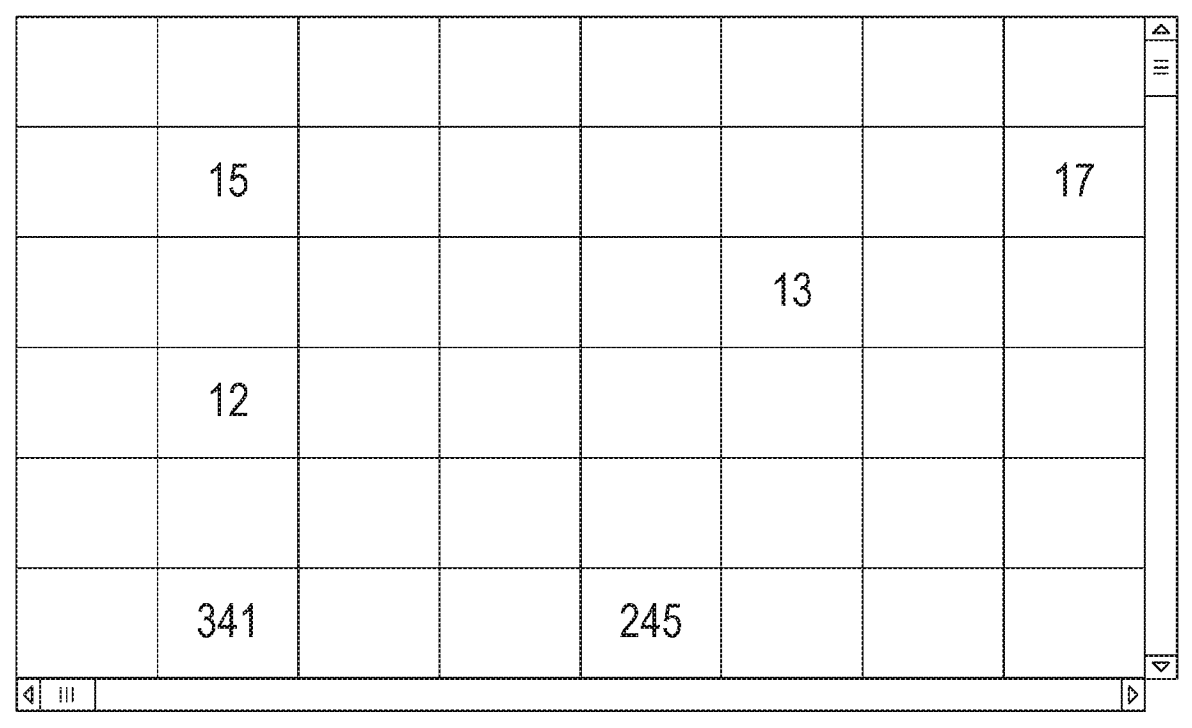
Figure 20C:
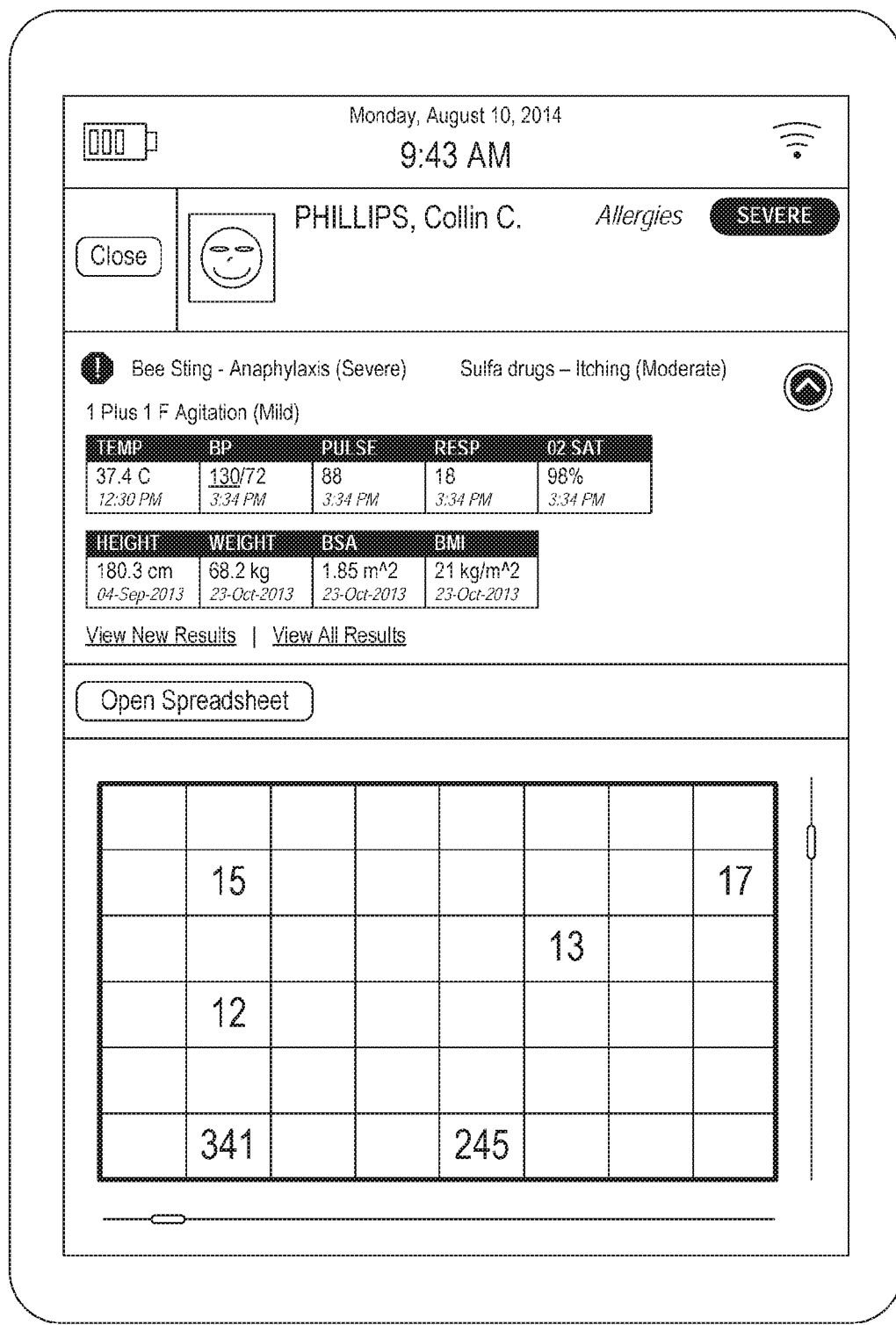

FIG. 19 illustrates an exemplary multi-dimensional array in the form of a spreadsheet having an x-axis and a y-axis. As noted hereinabove, if a user is only viewing a portion of the spreadsheet, such as the portion highlighted in FIG. 20A, then it can be difficult to ascertain whether there is additional data in a particular row that will be revealed if the user scrolls to the left, as illustrated in FIGS. 20B and 20C.

In accordance with one or more preferred implementations, a methodology may include three basic indicators, including a first one conveying that there is no information in a first direction (e.g. left), a second one conveying that there is no information in a second, opposite direction (e.g. right), and a third one conveying that there is no information in either direction (e.g. left and right). In accordance with one or more preferred implementations, more or less different indicators may be utilized.

Figure 21:
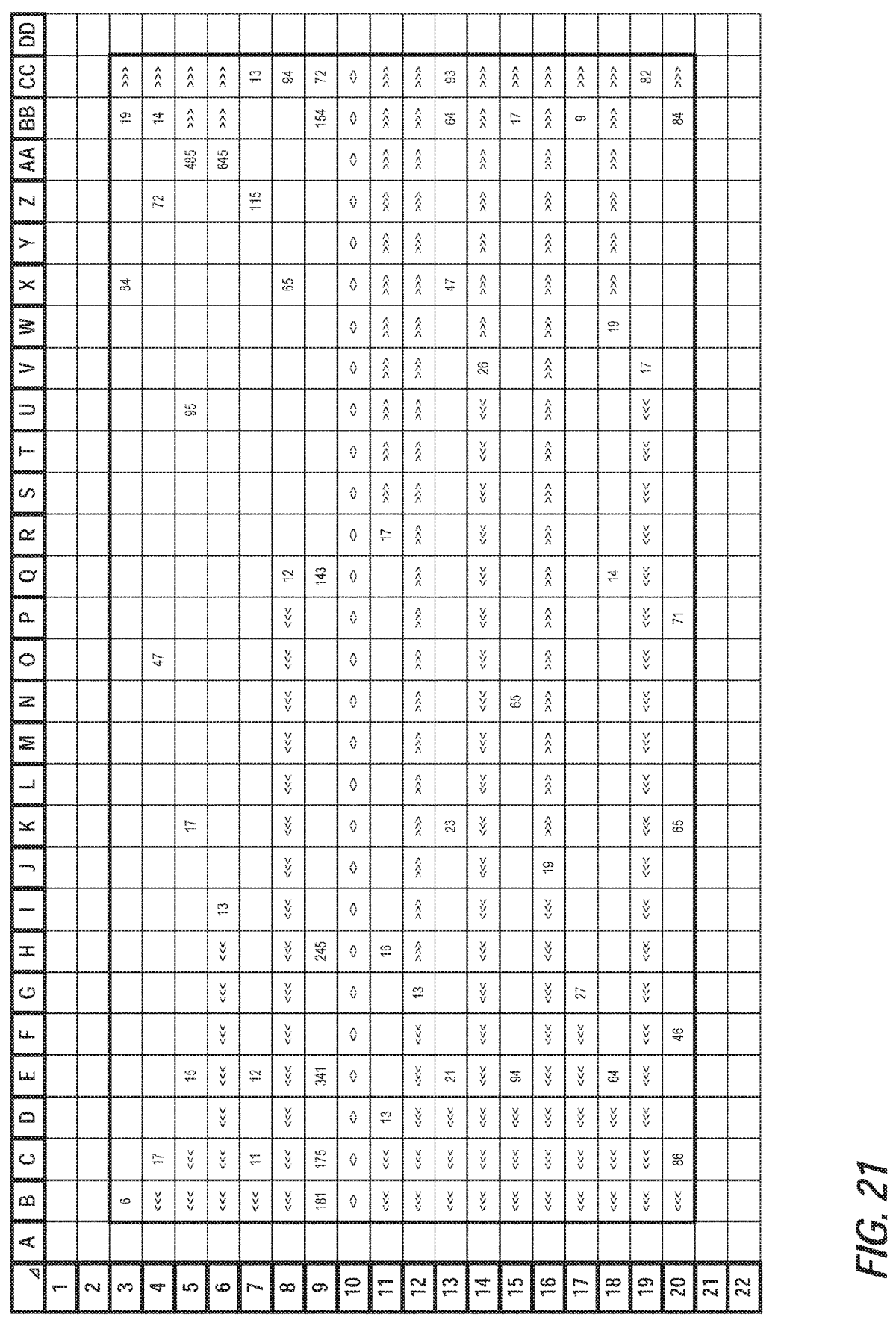

FIG. 21 illustrates the spreadsheet of FIG. 19 with a plurality of indications provided that convey that no additional information is available in a particular direction.

In accordance with one or more preferred implementations, these indications are provided as an overlay on top of a multi-dimensional array. In accordance with one or more preferred implementations, these indications are filled as a control character into entities (e.g. cells) of a multi-dimensional array. In accordance with one or more preferred implementations, entities (e.g. cells) of a multi-dimensional array are configured to hold and display information and further configured to maintain such indications.

In accordance with one or more preferred implementations, a methodology for generating such indications involves determining, for a first row, a first cell for which data is present, and determining that an indication is to be displayed for each cell of the first row between the associated axis and the first cell, and further involves determining, for the first row, a last cell for which data is present, and determining that an indication is to be displayed for each cell of the first row after the last cell. The methodology further involves repeating this process for each row. In accordance with one or more preferred implementations, a methodology further involves determining, for any rows for which no data is present, that an indication is to be displayed for each cell of that row. In accordance with one or more preferred implementations, a methodology further involves repeating the same process column-wise. In accordance with one or more preferred implementations, a methodology involves, for any cell for which it was determined multiple times that an indication is to be displayed, displaying a modified indication conveying multiple things. In accordance with one or more preferred implementations, a methodology further involves providing one or more indications based on such determinations.

Figure 22A:
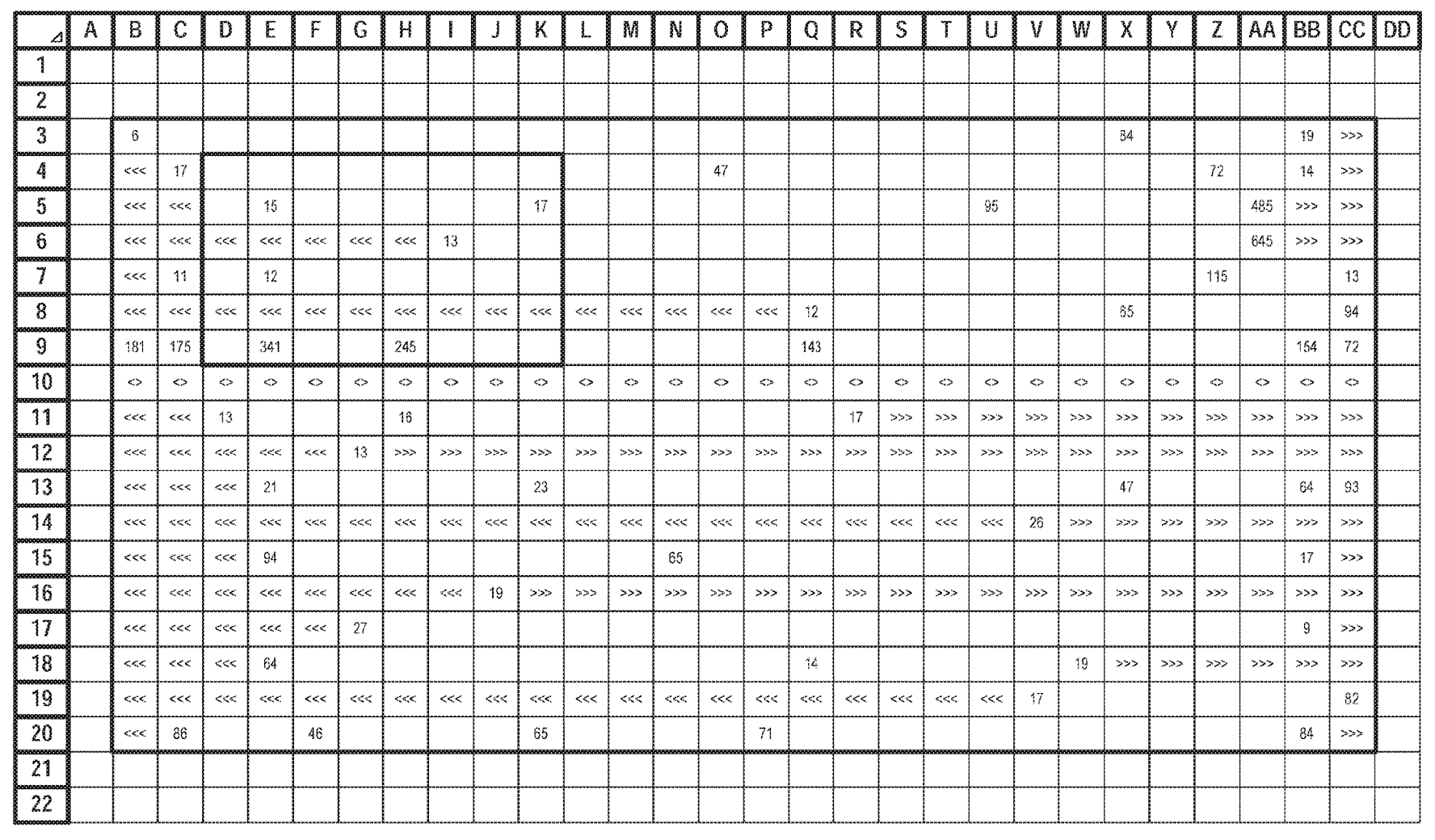
Figure 22B:
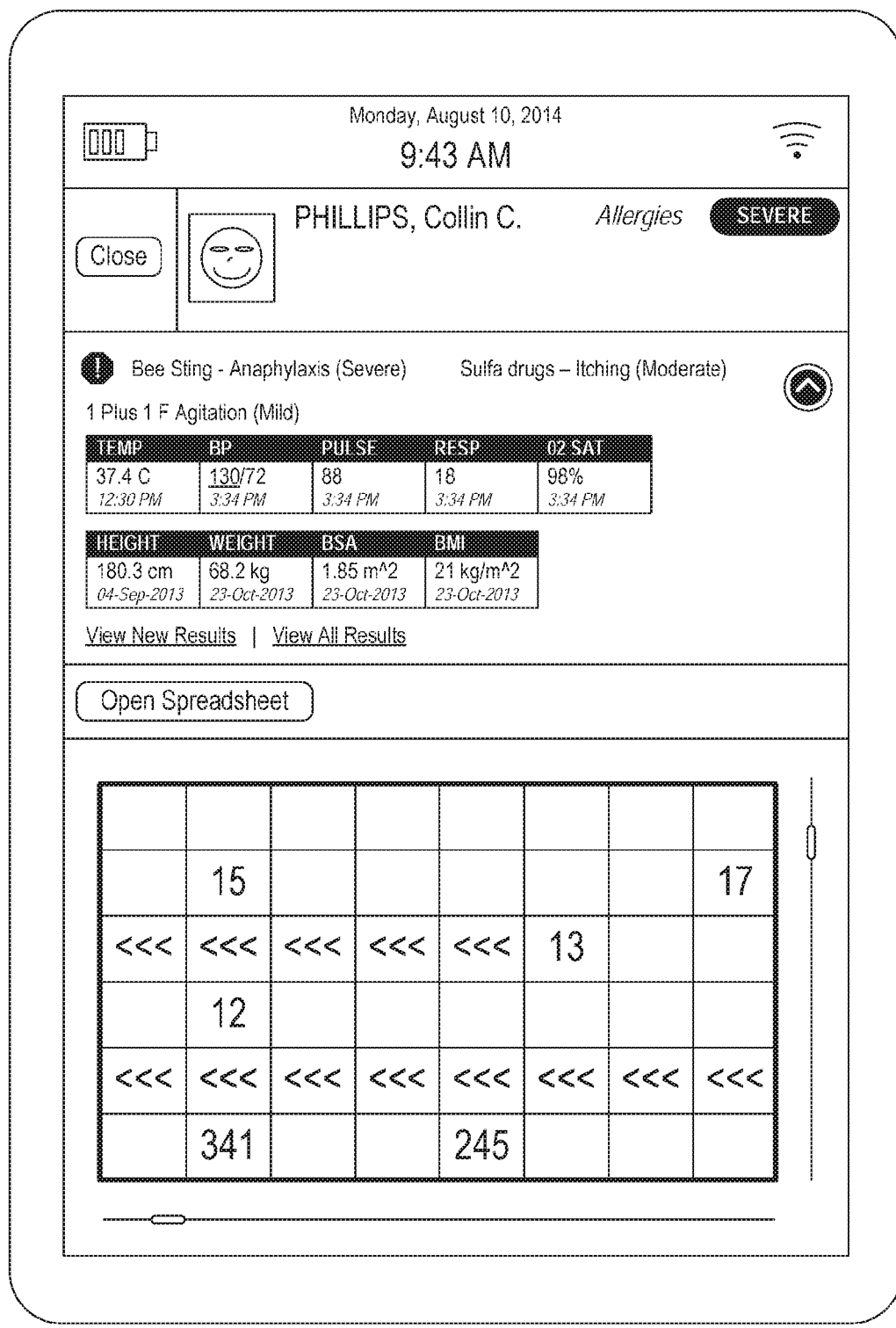
FIG. 22B illustrates the display of the highlighted portion of FIG. 22A.

Returning to the spreadsheet of FIG. 21, FIG. 22A highlights a portion of the spreadsheet, which portion is displayed in FIG. 22B. The display of arrow symbols overlaying a cell in a row provides a visual indication that no additional data is present in that row in the direction the arrows point, which conveys to the user that there is no need to scroll that direction to search for additional information in that row.

Figure 23A:
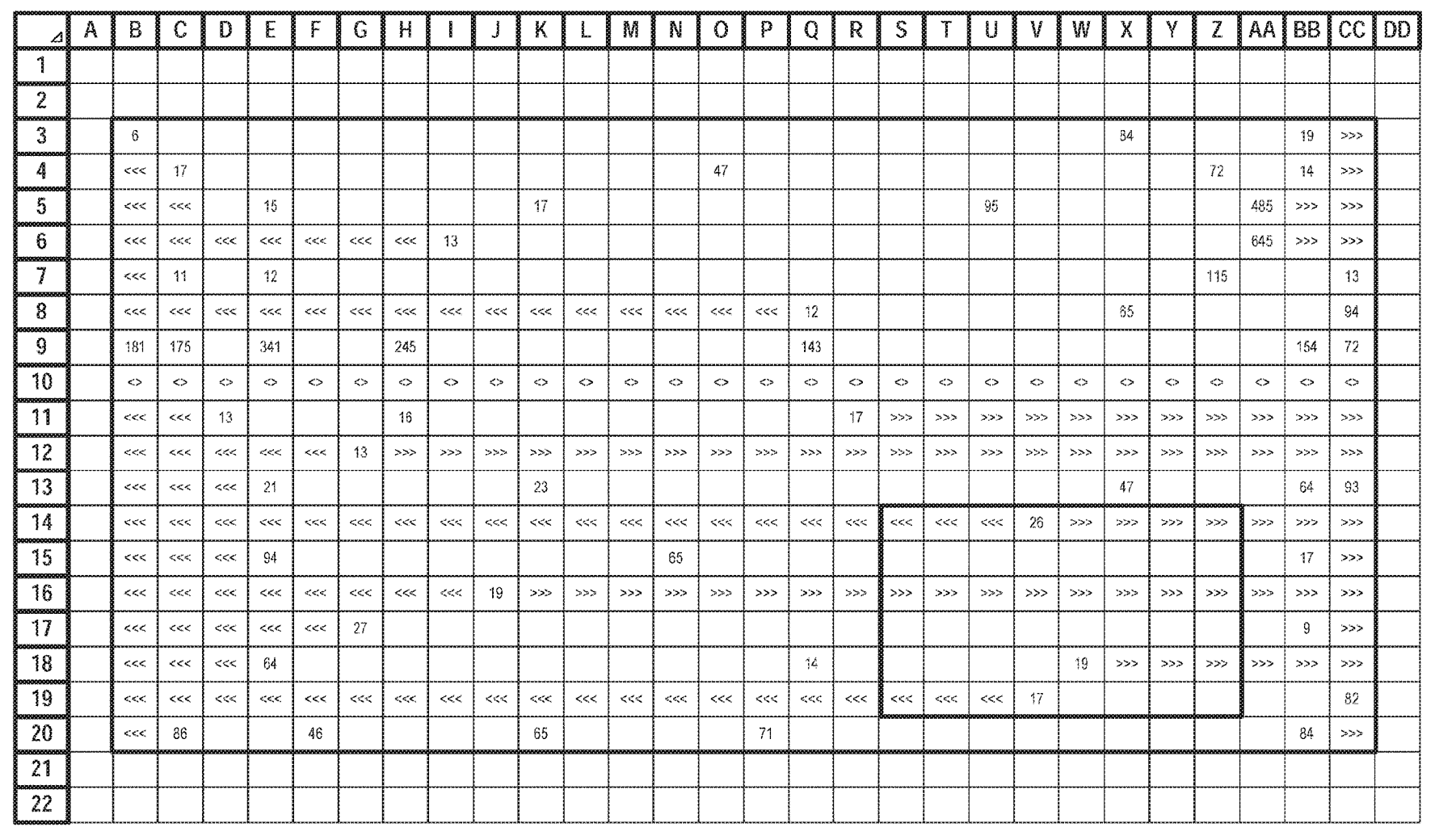
Figure 23B:
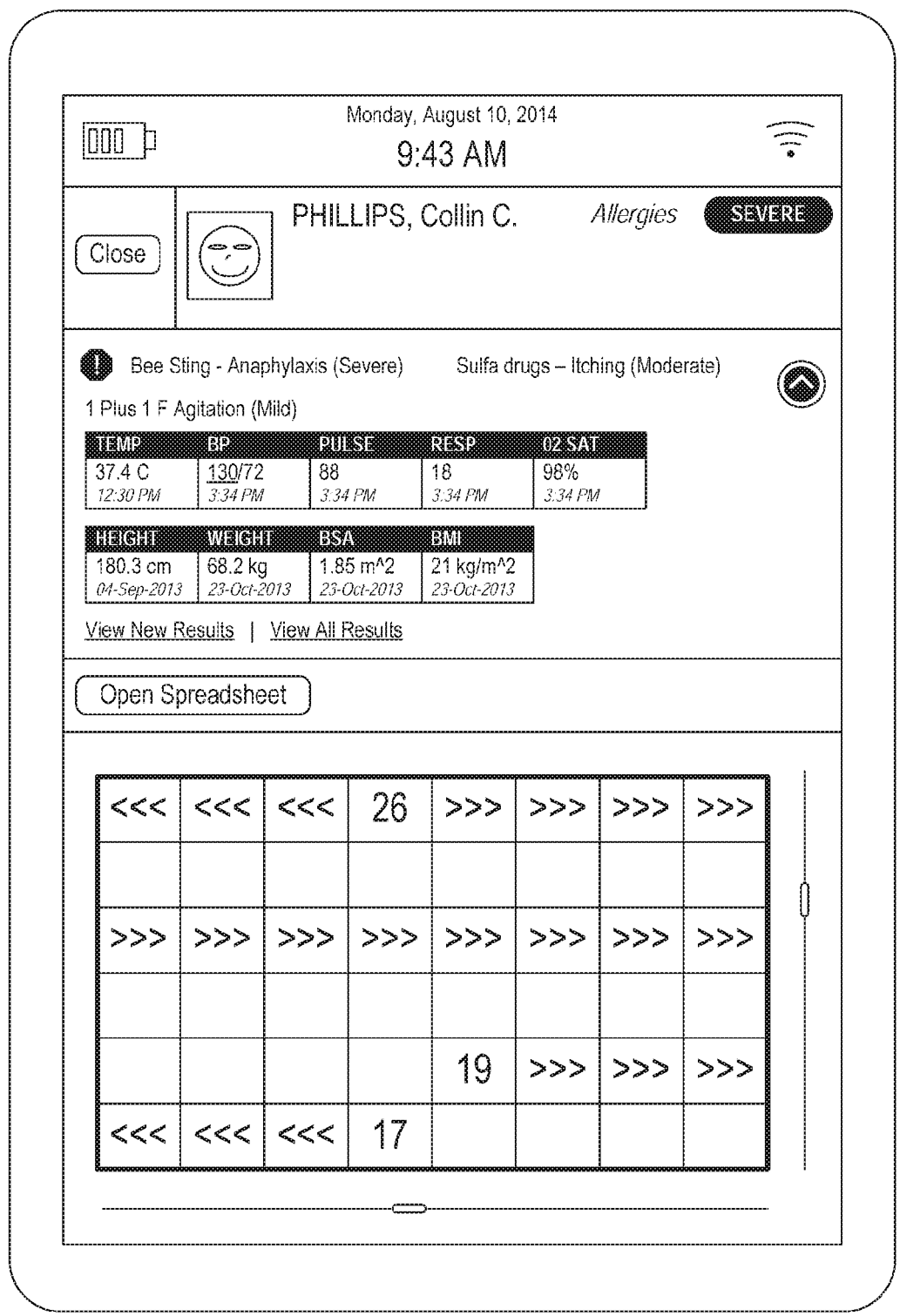
FIG. 23B illustrates the display of the highlighted portion of FIG. 23A.

FIG. 23A highlights another portion of the spreadsheet, which portion is displayed in FIG. 23B. Just like FIG. 22B, in FIG. 23B, the display of arrow symbols overlaying a cell in a row provides a visual indication that no additional data is present in that row in the direction the arrows point.

Figure 24A:
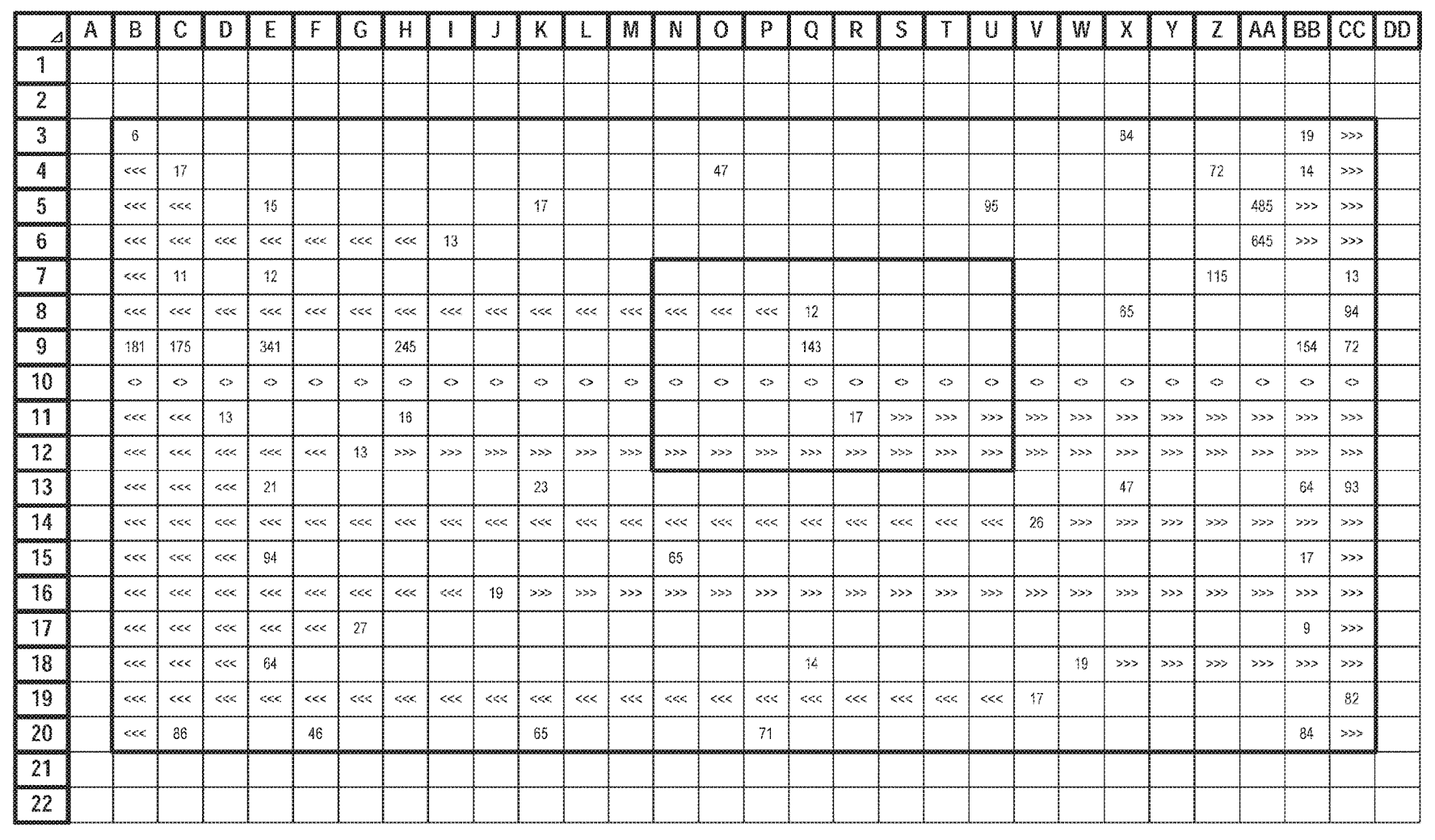
Figure 24B:
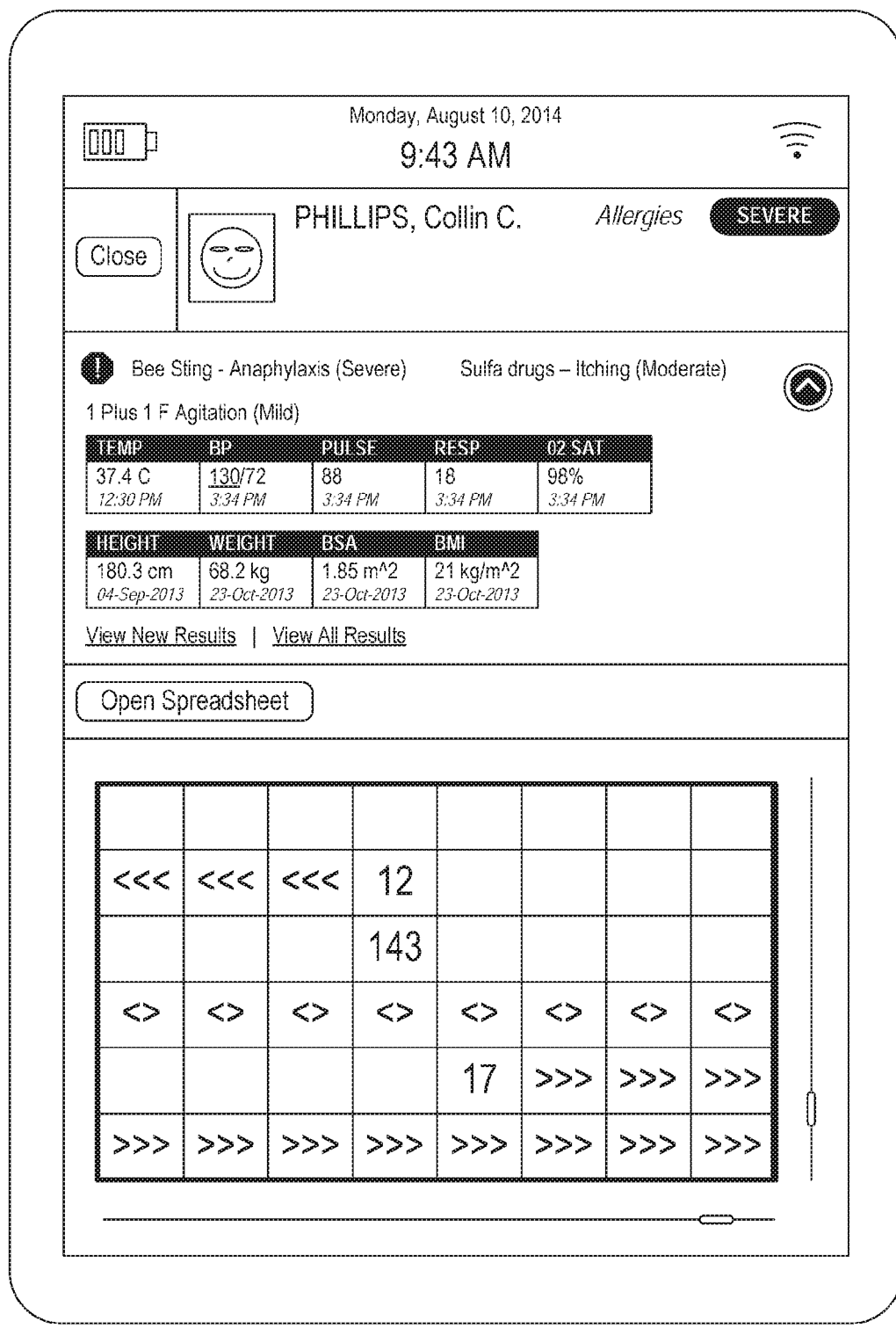
FIG. 24B illustrates the display of the highlighted portion of FIG. 24A.

FIG. 24A highlights yet another portion of the spreadsheet, which portion is displayed in FIG. 24B. In this portion, the display of an arrow symbol in both directions overlaying a cell in a row provides a visual indication that no additional data is present in that row in either direction.

Figure 25:
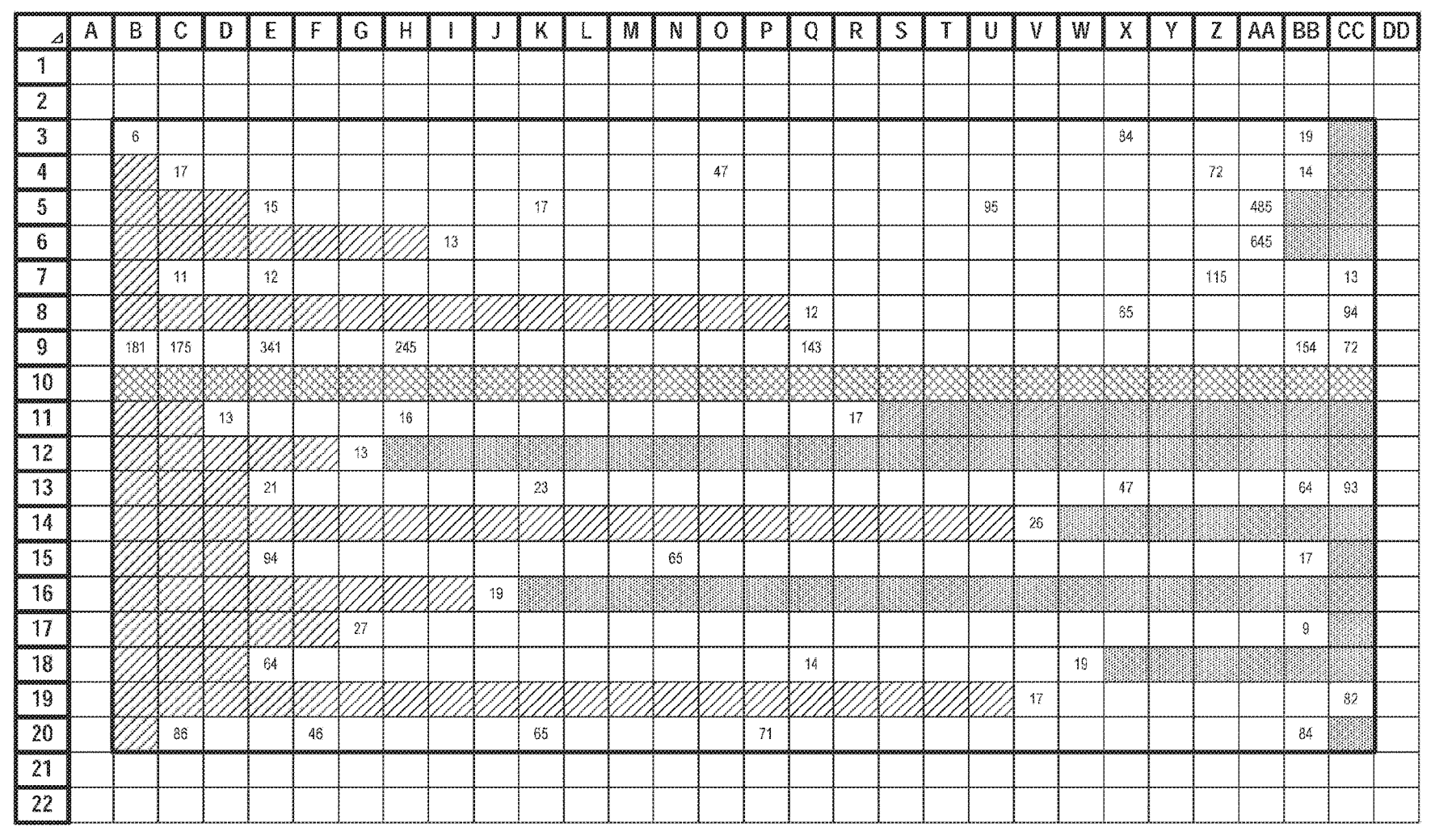
Figure 26:
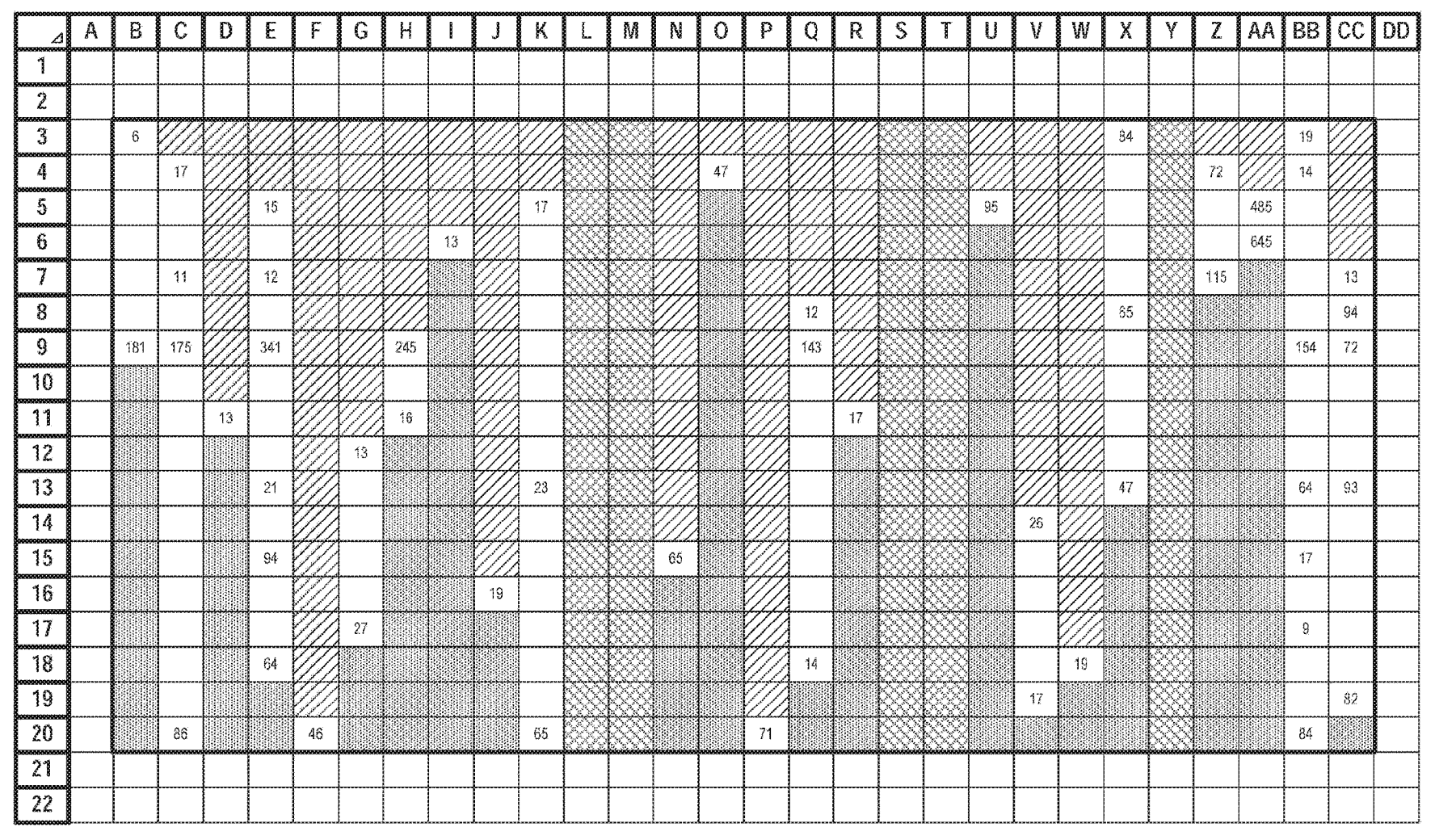

As described hereinabove, various visual coding schemes may be utilized to provide an indication. Although FIG. 21 illustrates visual coding utilizing arrow symbols, color or pattern coding may also be utilized, as illustrated in FIG. 25. Further, although FIG. 21 illustrates visual coding of information regarding row data, visual coding may similarly be utilized to convey information regarding column data, as illustrated in FIG. 26.

Although largely described herein in the context of a visual indication, in accordance with one or more preferred implementations an auditory or tactile indication may be provided. Such an indication may be provided as feedback based on user input or interaction (as noted hereinabove), or may be provided independent of any user input or interaction. Such an indication may comprise, for example, an auditory tone, recorded speech, automated speech, etc. Such an indication may include an indication of direction and magnitude. In accordance with one or more preferred implementations, a screen reader or other assistive technology is utilized to facilitate provision of an indication.

Although implementations are disclosed in which color coding is utilized to provide an indication, in accordance with one or more preferred implementations, text-tags may be utilized for color-blind users. For example, a cell might have a text tag of "[blue-cell]" or "[empty cell]". Similarly, an auditory indication may involve reading aloud such a text tag.

Although described herein thus far largely in the context of a data grid or a spreadsheet, preferred implementations include implementations utilized for other interfaces configured to provide information from a multi-dimensional array. These include, for example, an HTML table, data grid control, spreadsheet application, worksheet application, word processing application, web browser, etc.

Further, although described thus far largely in the context of a two dimensional array, preferred implementations include implementations utilized with a three dimensional or greater dimensional array.

Figure 27:
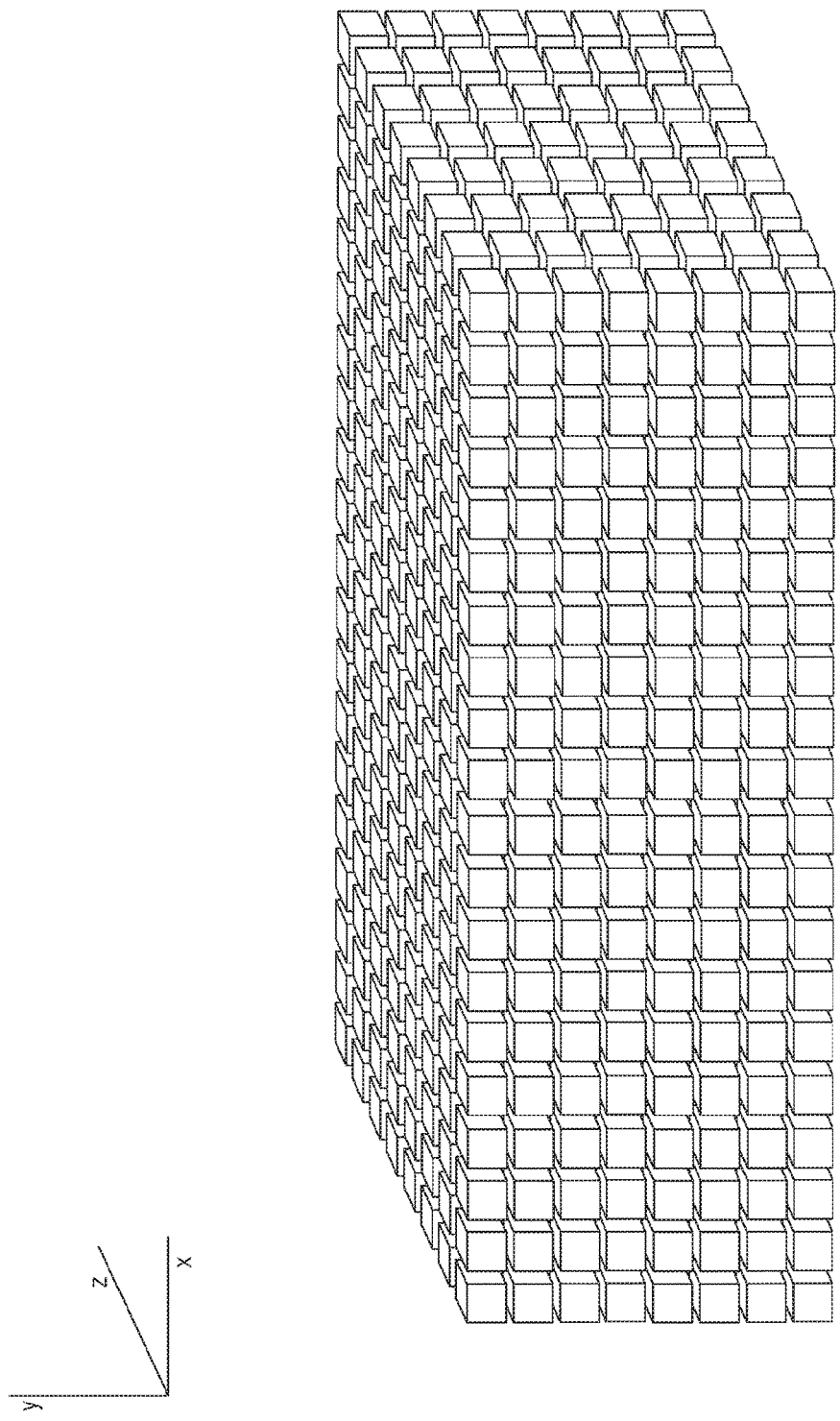
FIG. 27 illustrates a three dimensional array including a plurality of data entities arranged along an x-axis, a y-axis, and a z-axis.
Figure 28:
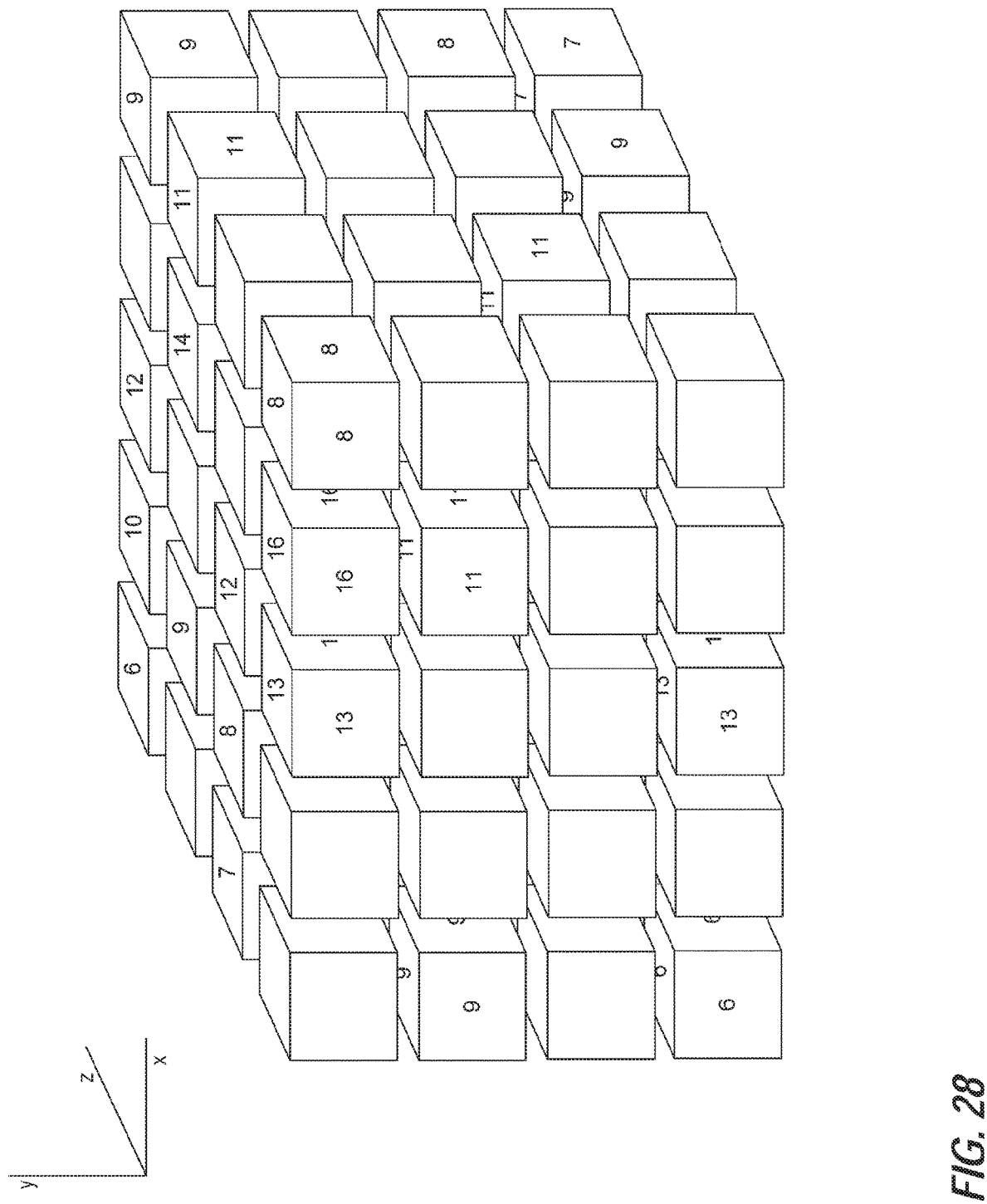
FIG. 28 illustrates a subset of the three dimensional array of FIG. 27.

For example, FIG. 27 illustrates a three dimensional array including a plurality of data entities arranged along an x-axis, a y-axis, and a z-axis. FIG. 28 illustrates a subset of this array. Notably, when viewing this subset, it is impossible for a user to ascertain whether additional information exists in a particular direction along a particular axis without having to navigate to another portion of the array to find out.

In accordance with one or more preferred implementations, visual coding is utilized to convey to a user that no additional information exists along a particular axis in a particular direction.

Figure 29:
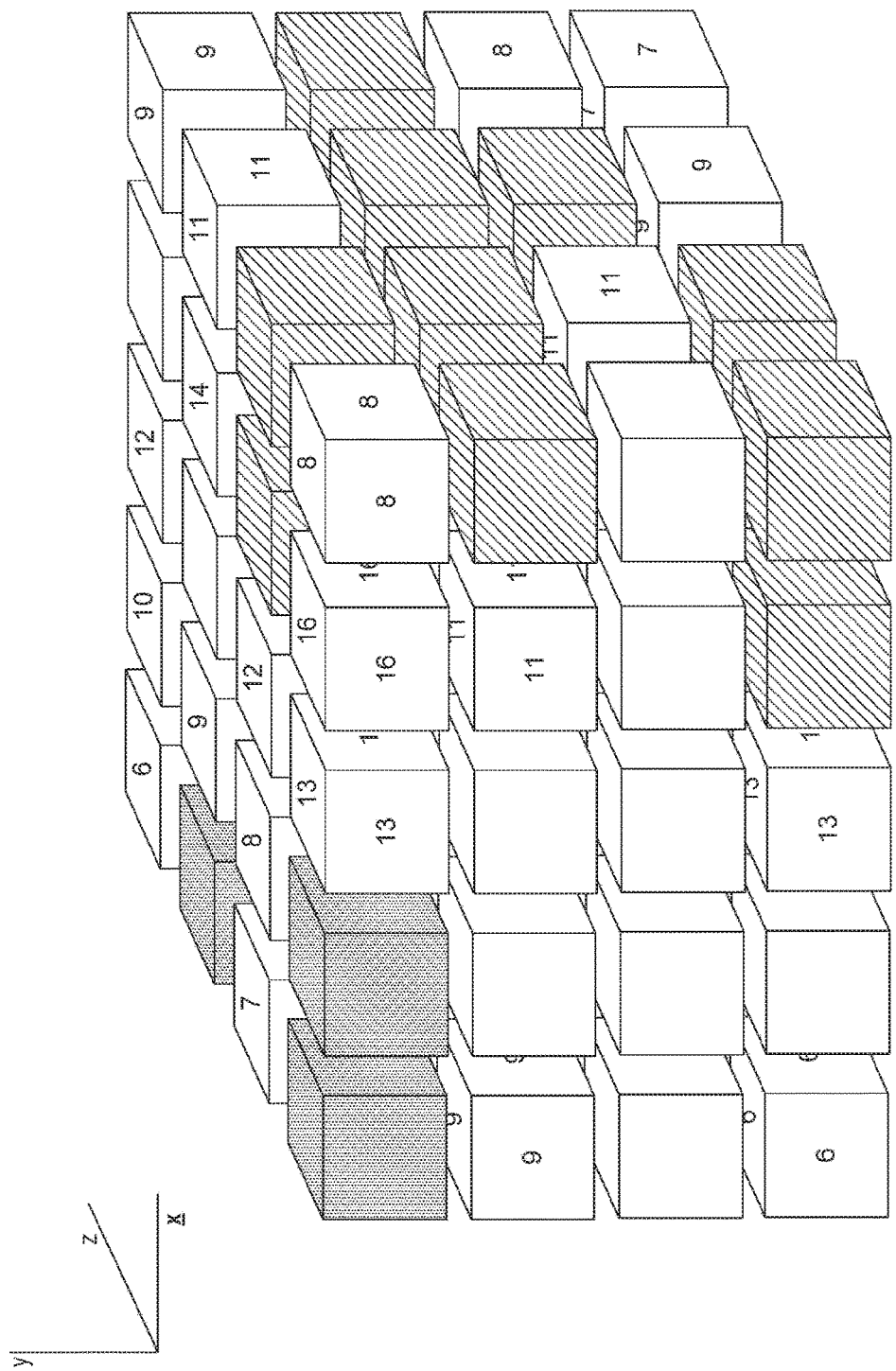
FIG. 29 illustrates the use of visual coding to indicate that no additional information is available in a particular direction along the x-axis.
Figure 30:
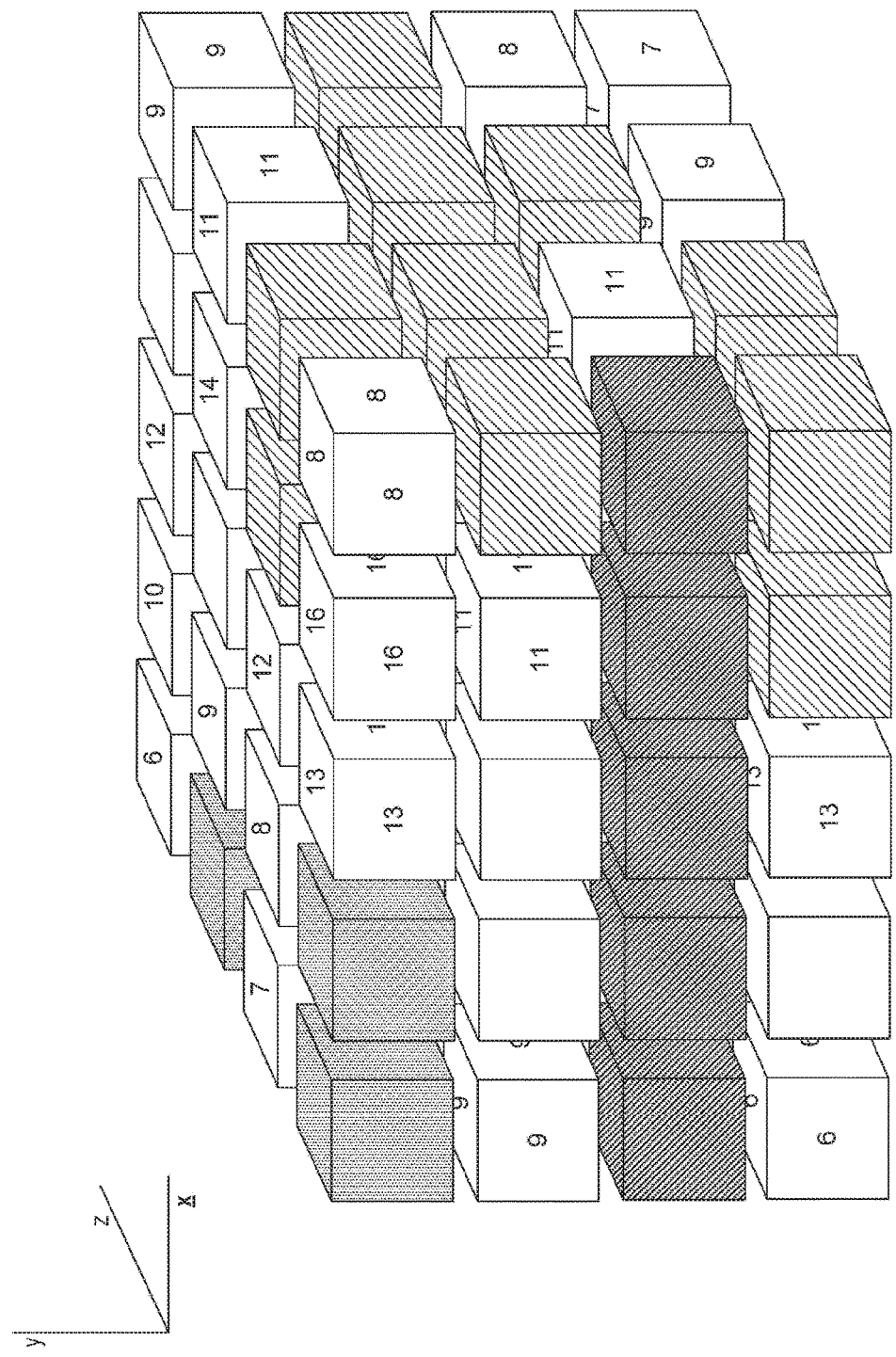
FIG. 30 illustrates use of a color to indicate that additional information is not available in either direction along the x-axis.

For example, FIG. 29 illustrates the use of visual coding to indicate that no additional information is available in a particular direction along the x-axis. A first color (illustrated as a first shading pattern) indicates that additional information is not available in a first direction along the x-axis, while a second color (illustrated as a second shading pattern) indicates that additional information is not available in a second, opposite direction along the x-axis. In FIG. 30, a third color (illustrated as a third shading pattern) indicates that additional information is not available in either direction along the x-axis.

Figure 31:
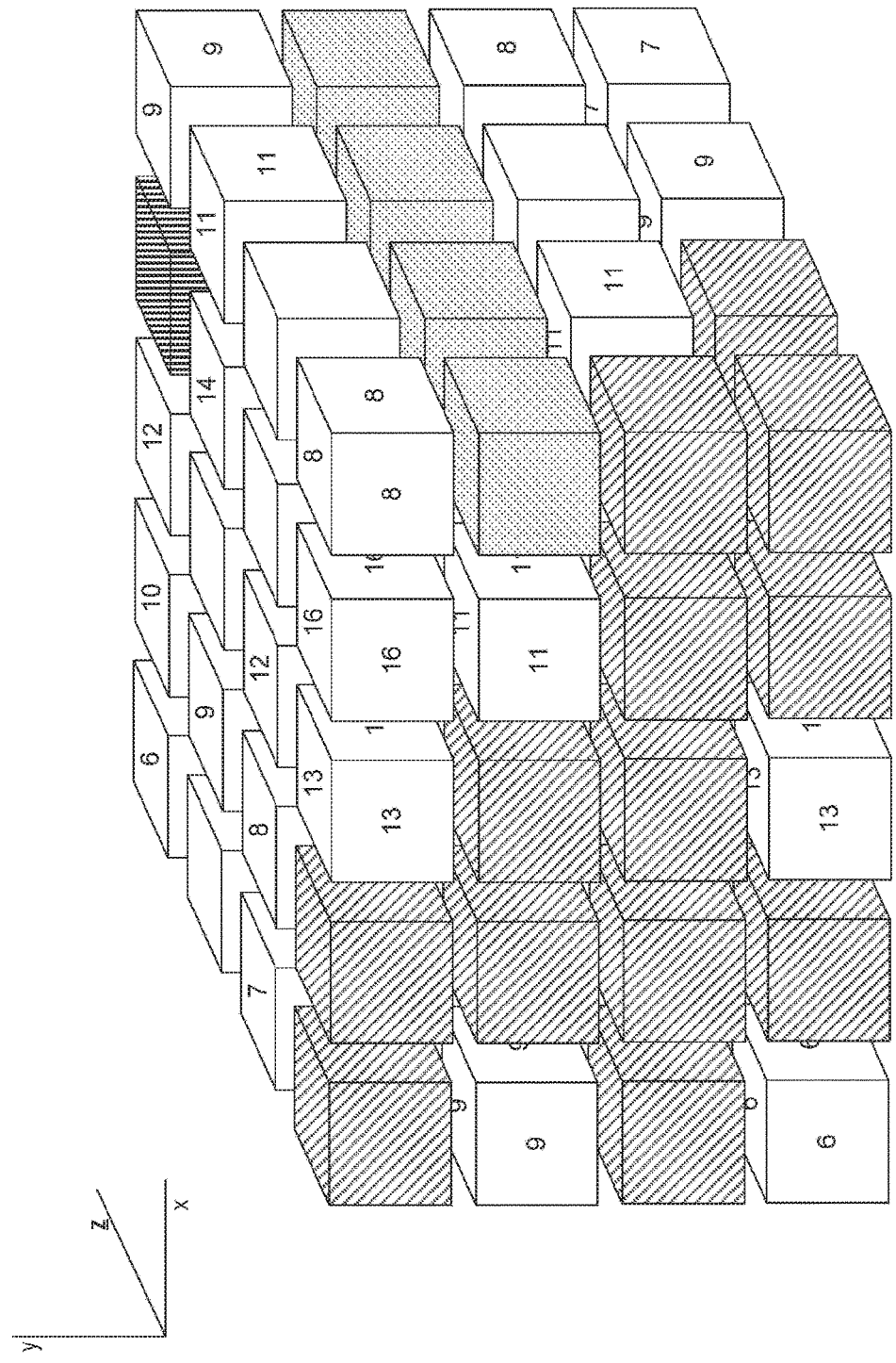
FIG. 31 illustrates the use of visual coding to indicate that no additional information is available in a particular direction along the z-axis.

FIG. 31 illustrates the use of visual coding to indicate that no additional information is available in a particular direction along the z-axis. A fourth color (illustrated as a fourth shading pattern) indicates that additional information is not available in a first direction along the z-axis, while a fifth color (illustrated as a fifth shading pattern) indicates that additional information is not available in a second, opposite direction along the z-axis. A sixth color (illustrated as a sixth shading pattern) indicates that additional information is not available in either direction along the z-axis.

Figure 32:
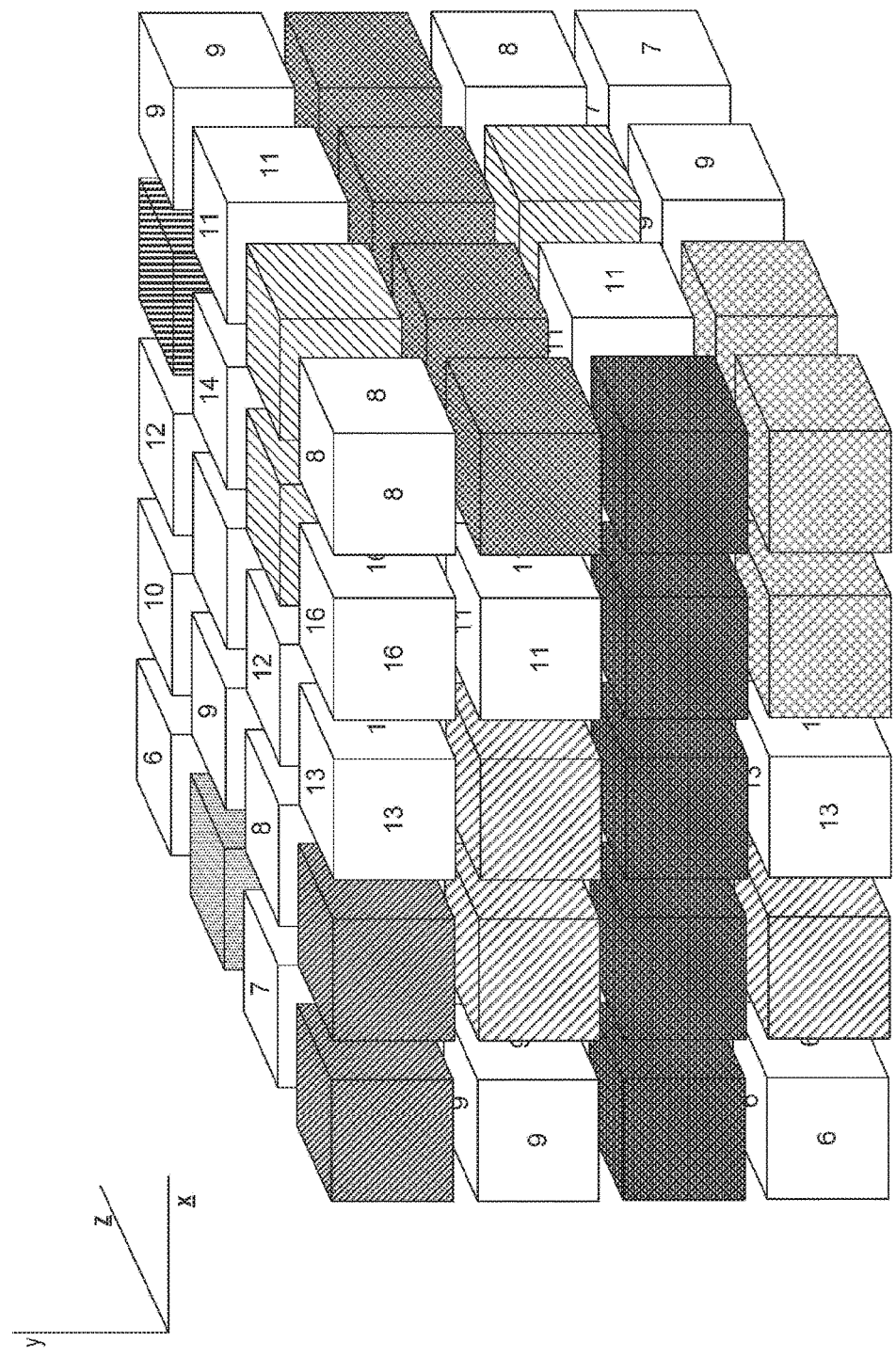
FIG. 32 illustrates the use of visual coding to indicate that no additional information is available in particular directions along both the x-axis and the z-axis.

FIG. 32 illustrates the use of visual coding to indicate that no additional information is available in particular directions along both the x-axis and the z-axis. Similar to the manner described hereinabove with respect to a two dimensional array, in accordance with one or more preferred implementations, patterns, symbol, or color coding is aggregated where it overlaps at a particular item in order to convey multiple different things.

Figure 33:
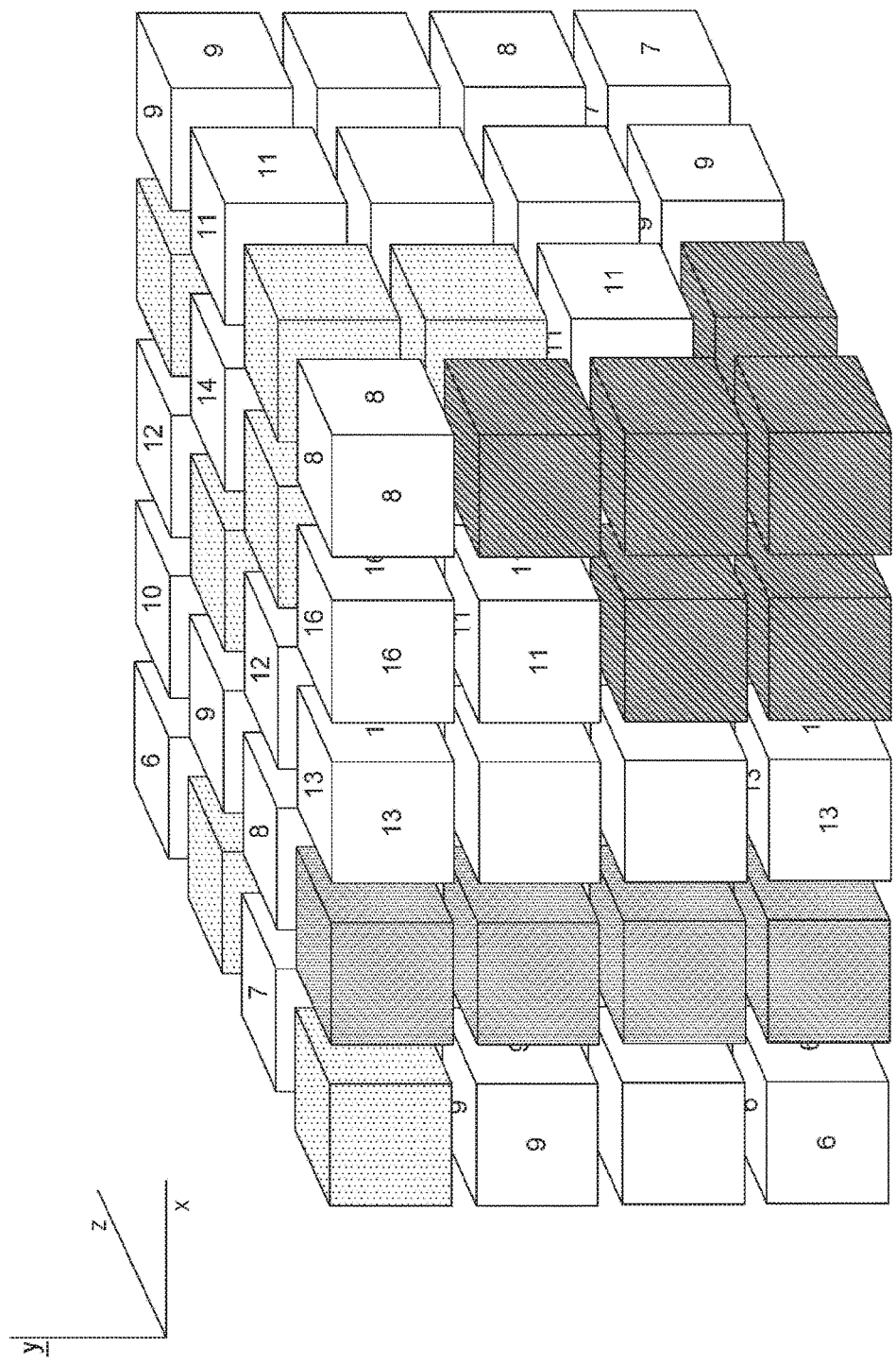
FIG. 33 illustrates the use of visual coding to indicate that no additional information is available in a particular direction along the y-axis.

FIG. 33 illustrates the use of visual coding to indicate that no additional information is available in a particular direction along the y-axis. A seventh color (illustrated as a seventh shading pattern) indicates that additional information is not available in a first direction along the z-axis, while an eighth color (illustrated as an eighth shading pattern) indicates that additional information is not available in a second, opposite direction along the z-axis. A ninth color (illustrated as a ninth shading pattern) indicates that additional information is not available in either direction along the z-axis.

In accordance with one or more preferred implementations, visual coding is utilized to indicate whether additional information is available in particular directions along the x-axis, the y-axis, and the z-axis. Similar to the manner described hereinabove with respect to a two dimensional array, in accordance with one or more preferred implementations, patterns, symbol, or color coding is aggregated where it overlaps at a particular item in order to convey multiple different things.

Figure 34:
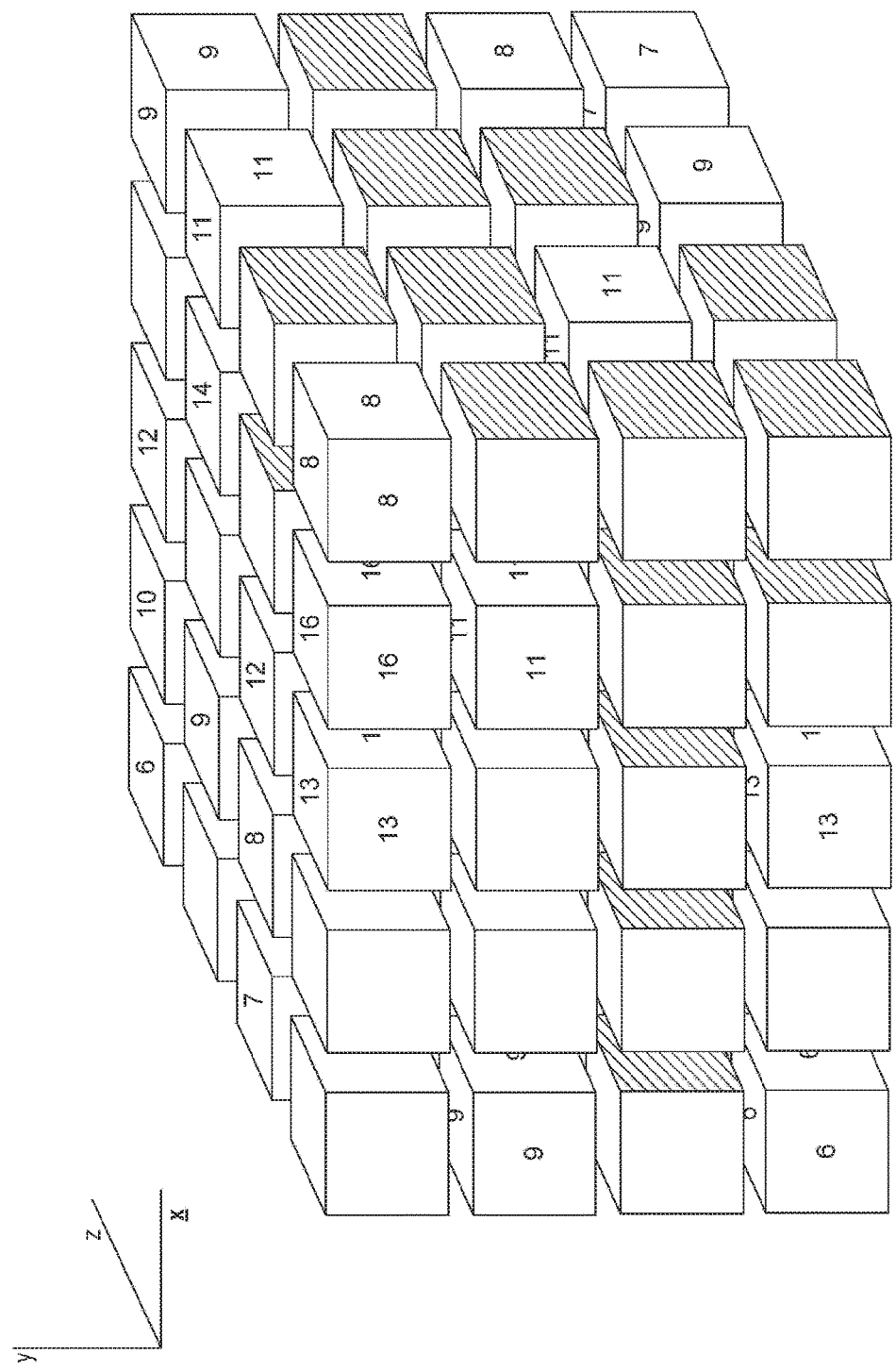
FIG. 34 illustrates color/pattern coding of a particular side of a cube entity.
Figure 35:
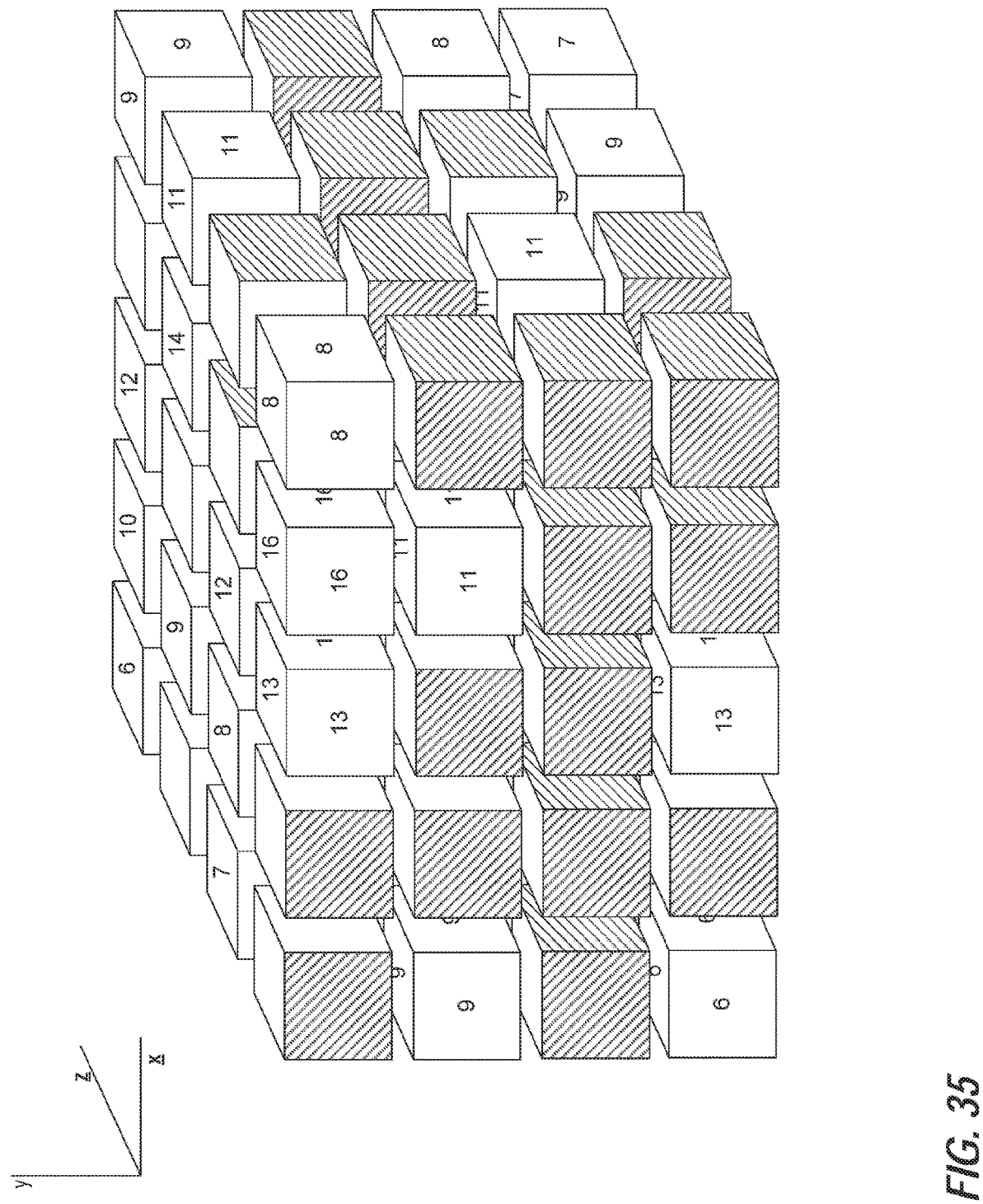
FIG. 35 illustrates color/pattern coding of a front side of cube entities which indicates that no additional information is available along the z-axis to the front.

However, for the sake of simplicity, in one or more preferred implementations, another coding scheme may be utilized where only a portion of an entity is coded for information regarding a particular axis and/or direction. For example, FIG. 34 illustrates color/pattern coding of a particular side of a cube entity. In particular, FIG. 34 illustrates color/pattern coding of a right side of cube entities which indicates that no additional information is available along the x-axis to the right. Similarly, FIG. 35 illustrates color/pattern coding of a front side of cube entities which indicates that no additional information is available along the z-axis to the front, and FIG. 36 illustrates color/pattern coding of a top side of cube entities which indicates that no additional information is available along the y-axis thereabove.

Figure 36:
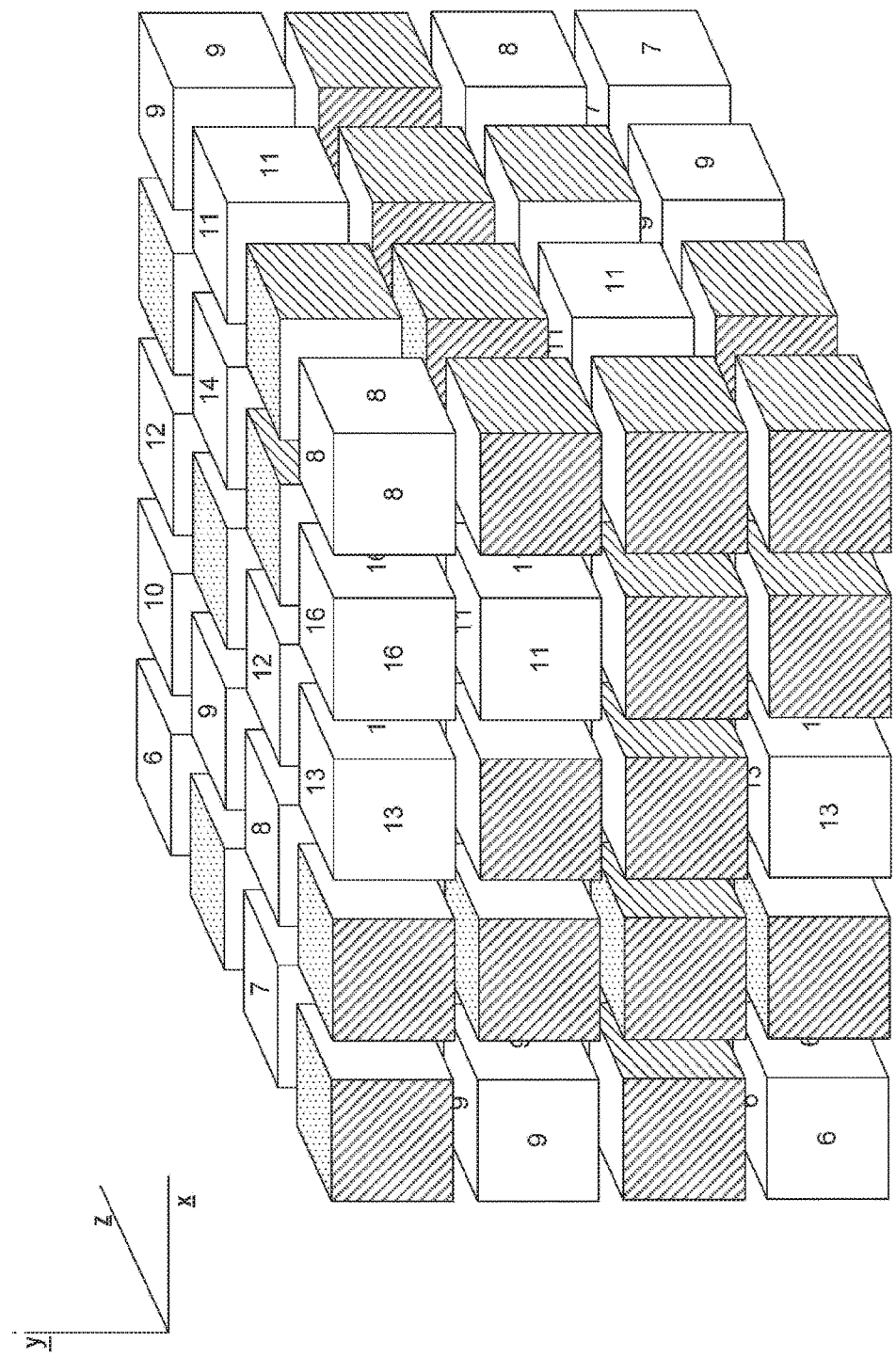
FIG. 36 illustrates color/pattern coding of atop side of cube entities which indicates that no additional information is available along the y-axis thereabove.
Figure 37:
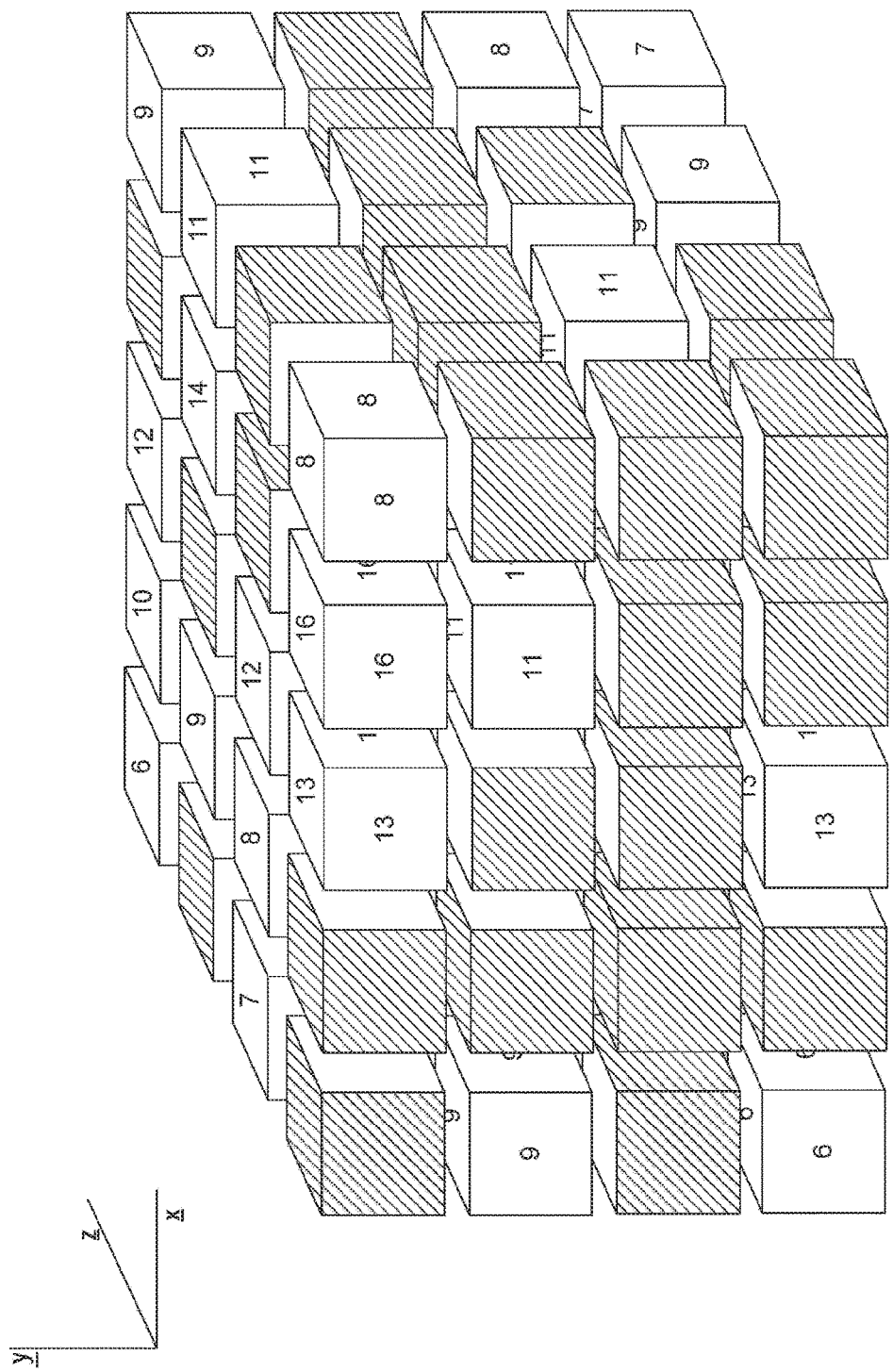
FIG. 37 illustrates the use of the same color/pattern for coding of sides of cube entities.

In accordance with one or more preferred implementations, different colors may be utilized to provide indications regarding different axes and/or different directions, as illustrated in FIG. 36, or the same color may be utilized, as illustrated in FIG. 37.

Figure 38:
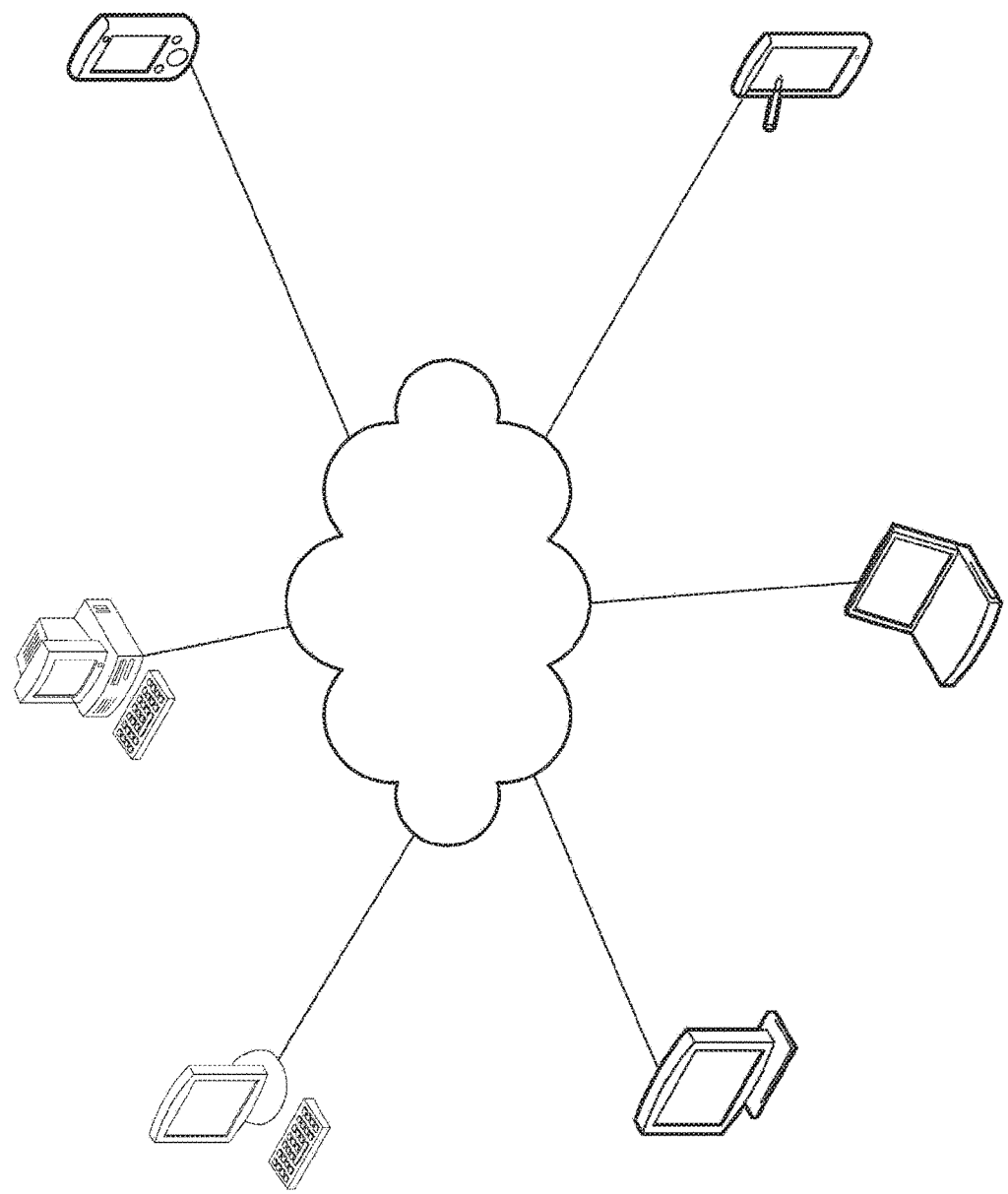
FIG. 38 illustrates various electronic devices that may be utilized to run software providing an interface for navigation and interaction with multi-dimensional arrays.

Although not thus far described herein in much detail, it will be appreciated that software providing an interface for navigation and interaction with multi-dimensional arrays may be provided and utilized on various electronic devices, such as a desktop computer, laptop computer, tablet, phone, smart phone, smart appliance, medical device, slate computer, all-in-one computer, etc. Exemplary such devices are illustrated in FIG. 38. It will be appreciated that a multi-dimensional array may comprise information stored locally at an electronic device, or accessed over a network, or from a remote server or other device, or from a cloud, or even information stored in a storage area network, etc.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations. modifications or equivalent arrangements, the present invention being limited only by the claims appended hereto and the equivalents thereof.

What is claimed is:

1. A client computing device comprising:
    a processor;
    a display; and
    memory that has an application loaded therein, wherein the application, when executed by the processor, causes the processor to perform acts comprising:
        causing display of a spreadsheet at the display of the client computing device by way of a graphical user interface (GUI) of the application;
        evaluating the spreadsheet being displayed at the client computing device, wherein the spreadsheet comprises a first spreadsheet portion presently being displayed at the display of the client computing device and a second spreadsheet portion not being displayed at the display of the client computing device;
        identifying that a cell in a row of the spreadsheet comprises data within the first spreadsheet portion;
        identifying that all cells to the right of the cell in the row fail to comprise data within the second spreadsheet portion, where the row comprises first cells to the right of the cell that are within the first spreadsheet portion, and second cells to the right of the cell that are within the second spreadsheet portion; and
        subsequent to identifying that all cells to the right of the cell in the row fail to comprise data within the second spreadsheet portion, displaying, in each cell in the first cells that is to the right of the cell in the row, an indicator that indicates that each cell in the first cells and the second cells to the right of the displayed cell in the row fails to comprise data.

2. The client computing device of claim 1, the acts further comprising:
    identifying that a second cell of the spreadsheet comprises data, wherein the second cell is in a column of the spreadsheet;
    identifying that all cells below the second cell in the column fail to comprise data; and displaying, within the GUI, the second cell, wherein the second cell has a second indicator therein that indicates that all cells below the second cell in the column fail to comprise data.

3. The client computing device of claim 1, the acts further comprising:
identifying that a second cell of the spreadsheet comprises data, wherein the second cell is in a column of the spreadsheet;
identifying that multiple cells below the second cell in the column comprise data; and
displaying, within the GUI, the second cell, wherein the second cell has a second indicator therein that indicates that a third cell below the second cell in the column comprises data.

4. The client computing device of claim 1, the acts further comprising:
identifying that a second cell of the spreadsheet comprises data, wherein the second cell is in a column of the spreadsheet;
identifying that all cells above the second cell in the column fail to comprise data; and
displaying, within the GUI, the second cell, wherein the second cell has a second indicator therein that indicates that all cells above the second cell in the column fail to comprise data.

5. The client computing device of claim 1, the acts further comprising:
identifying that all cells to the left of a second cell in the row fail to comprise data within the second spreadsheet portion, wherein the row comprises third cells to the left of the second cell that are within the first spreadsheet portion and fourth cells to the left of the second cell that are within the second spreadsheet portion; and
subsequent to identifying that all cells to the left of the second cell in the row fail to comprise data within the second spreadsheet portion, displaying, in each cell in the third cells that is to the left of the second cell in the row, an indicator that indicates that each cell in the first cells and the second cells to the left of the displayed second cell in the row fails to comprise data.

6. The client computing device of claim 1, the acts further comprising:
identifying that multiple cells to the left of a second cell in the row comprise data; and
displaying, within the GUI, the second cell, wherein the second cell has a second indicator therein that indicates that a third cell to the left of the second cell in the row comprises data.

7. The client computing device of claim 1, the acts further comprising:
identifying that multiple cells to the right of a second cell in the row comprise data; and
displaying, within the GUI, the second cell, wherein the second cell has a second indicator therein that indicates that a third cell to the right of the second cell in the row comprises data.

8. The client computing device of claim 1, wherein the cell in the row has a second indicator therein that indicates that each cell in a second row of the spreadsheet fails to comprise data.

9. The client computing device of claim 1, wherein the indicator comprises:
a symbol;
a color; or
a pattern.

10. A method executed by a client computing device, wherein the client computing device executes an application that is configured to display one or more spreadsheets, the method comprising:
causing display of a spreadsheet at a display of the client computing device by way of a graphical user interface (GUI) of the application;
evaluating the spreadsheet being displayed at the client computing device, wherein the spreadsheet comprises a first spreadsheet portion presently being displayed at the display of the client computing device and a second spreadsheet portion not being displayed at the display of the client computing device;
identifying that a cell in a row of the spreadsheet comprises data within the first spreadsheet portion;
identifying that all cells to the right of the cell in the row fail to comprise data within the second spreadsheet portion, where the row comprises first cells to the right of the cell that are within the first spreadsheet portion, and second cells to the right of the cell that are within the second spreadsheet portion; and
subsequent to identifying that all cells to the right of the cell in the row fail to comprise data within the second spreadsheet portion, displaying, in each cell in the first cells that is to the right of the cell in the row, an indicator that indicates that each cell in the first cells and the second cells to the right of the displayed cell in the row fails to comprise data.

11. The method of claim 10, further comprising:
identifying that a second cell of the spreadsheet comprises data, wherein the second cell is in a column of the spreadsheet;
identifying that multiple cells above the second cell in the column comprise data; and
displaying, within the GUI, the second cell, wherein the second cell has a second indicator therein that indicates that a third cell above the second cell in the column comprises data.

12. The method of claim 10, wherein the cell is in a column, the method further comprising:
identifying that all cells below the cell in the column fail to comprise data; and
displaying, within the GUI, the cell in the column, wherein the cell has a second indicator therein that indicates that all cells below the cell fail to comprise data.

13. The method of claim 10, wherein the cell is in a column, the method further comprising:
identifying that all cells above the cell in the column fail to comprise data; and
displaying, within the GUI, the cell in the column, wherein the cell has a second indicator therein that indicates that all cells above the cell in the column and all cells to the right of the cell in the row fail to comprise data.

14. The method of claim 10, further comprising:
identifying that all cells to the left of a second cell in the row fail to comprise data within the second spreadsheet portion, wherein the row comprises third cells to the left of the second cell that are within the first spreadsheet portion and fourth cells to the left of the second cell that are within the second spreadsheet portion; and
subsequent to identifying that all cells to the left of the second cell in the row fail to comprise data within the second spreadsheet portion, displaying, in each cell in the third cells that is to the left of the second cell in the row, an indicator that indicates that each cell in the first cells and the second cells to the left of the displayed second cell in the row fails to comprise data.

15. The method of claim 10, further comprising:
identifying that multiple cells to the left of a second cell in the row comprise data;
displaying, within the GUI, the second cell, wherein the second cell has a second indicator therein that indicates that a third cell to the left of the second cell in the row comprises data.

16. The method of claim 10, wherein a second cell in a second row of the spreadsheet has a second indicator therein that indicates that each cell in the second row of the spreadsheet to the right or to the left of the second cell fails to comprise data.

17. A non-transitory computer-readable storage medium comprising a client electronic health records application (client EHR), wherein the client EHR, when executed by a processor, causes the processor to perform acts comprising:
causing display of a spreadsheet at a display of a client computing device executing the client EHR, by way of a graphical user interface (GUI) of the client EHR;
evaluating the spreadsheet being displayed at the client computing device, wherein the spreadsheet comprises a first spreadsheet portion presently being displayed at the display of the client computing device and a second spreadsheet portion not being displayed at the display of the client computing device;
identifying that a cell in a row of the spreadsheet comprises clinical data pertaining to a patient within the first spreadsheet portion;
identifying that all cells to the right of the cell in the row fail to comprise data within the second spreadsheet portion, where the row comprises first cells to the right of the cell that are within the first spreadsheet portion, and second cells to the right of the cell that are within the second spreadsheet portion; and
subsequent to identifying that all cells to the right of the cell in the row fail to comprise data within the second spreadsheet portion, displaying, in each cell in the first cells that is to the right of the cell in the row, an indicator that indicates that each cell in the first cells and the second cells to the right of the displayed cell in the row fails to comprise data.

18. The non-transitory computer-readable storage medium of claim 17, the acts further comprising:
identifying that multiple cells to the left of a second cell in the row comprise data;
displaying, within the GUI, the second cell, wherein the second cell has a second indicator therein that indicates that a third cell to the left of the second cell in the row comprises data;
identifying that multiple cells to the right of a fourth cell in the row comprise data; and
displaying, within the GUI, the fourth cell, wherein the fourth cell has a third indicator therein that indicates that a fifth cell to the right of the fourth cell in the row comprises data.

19. The non-transitory computer-readable storage medium of claim 17, the acts further comprising:
identifying that all cells to the left of a second cell in the row fail to comprise clinical data within the second spreadsheet portion, wherein the row comprises third cells to the left of the second cell that are within the first spreadsheet portion and fourth cells to the left of the second cell that are within the second spreadsheet portion; and
subsequent to identifying that all cells to the left of the second cell in the row fail to comprise clinical data within the second spreadsheet portion, displaying, in each cell in the third cells that is to the left of the second cell in the row, an indicator that indicates that each cell in the first cells and the second cells to the left of the displayed second cell in the row fails to comprise clinical data.

20. The non-transitory computer-readable storage medium of claim 17, the acts further comprising identifying that each cell in a second row of the spreadsheet fails to comprise clinical data, and wherein a second cell in a second row of the spreadsheet has a second indicator therein that indicates that each cell to the right or to the left of the second cell in the second row of the spreadsheet fails to comprise clinical data.

\* \* \* \* \*